(12) United States Patent
Roth et al.

(10) Patent No.: US 12,736,264 B2
(45) Date of Patent: Sep. 15, 2026

(54) NUGGET ICE MAKER

(71) Applicant: Sub-Zero Group, Inc., Madison, WI (US)

(72) Inventors: Keith Harold Roth, Crystal Lake, IL (US); Thomas Michael Lasecki, Waterloo, WI (US)

(73) Assignee: Sub-Zero Group, Inc., Madison, WI (US)

(*) Notice: Subject to any disclaimer, the term of this patent is extended or adjusted under 35 U.S.C. 154(b) by 452 days.

(21) Appl. No.: 17/940,137

(22) Filed: Sep. 8, 2022

(65) Prior Publication Data

US 2024/0085078 A1 Mar. 14, 2024

(51) Int. Cl.
*F25C 1/147* (2018.01)
*F16C 35/077* (2006.01)

(52) U.S. Cl.
CPC ............ *F25C 1/147* (2013.01); *F16C 35/077* (2013.01)

(58) Field of Classification Search
CPC ........................................................ F25C 1/147
See application file for complete search history.

(56) References Cited

U.S. PATENT DOCUMENTS 3,233,417 A 2/1966 Soderberg
4,250,718 A * 2/1981 Brantley ................ F25C 1/147 277/910
5,037,004 A * 8/1991 Katz ......................... F25C 5/22 222/413
5,664,434 A 9/1997 Sugie et al.
10,222,110 B2 3/2019 Mitchell et al.
10,386,106 B2 8/2019 Mitchell et al.

FOREIGN PATENT DOCUMENTS

CN 2611835 Y * 4/2004
CN 211290660 U * 8/2020 ................ F25C 5/02
JP 5469933 B2 * 4/2014

OTHER PUBLICATIONS

Translated_Huang (Year: 2004).*
Translated_Yasuoki (Year: 2014).*
Translated_Xu (Year: 2020).*

* cited by examiner

*Primary Examiner* — Jerry-Daryl Fletcher
*Assistant Examiner* — Samba Gaye
(74) *Attorney, Agent, or Firm* — Boardman & Clark LLP

(57) ABSTRACT

An ice maker includes an evaporator body, an end cap, an auger, a bearing, and a bearing cup. The end cap is mounted to the evaporator body and includes a cap bottom wall and a cap sidewall mounted to extend away from the cap bottom wall. The cap sidewall is positioned within the evaporator body. The auger includes an auger body, a connector rod, and a base. A first end of the connector rod is mounted to a first end of the auger body. The base is mounted to extend away from a second end of the auger body. The bearing is mounted to the base of the auger within the cap sidewall. The bearing cup includes an auger mounting shelf wall mounted to the base and a cup sidewall mounted to extend away from the auger mounting shelf wall. The cup sidewall surrounds the bearing and the cap sidewall.

16 Claims, 28 Drawing Sheets

806
822
804
402
820
602
500
800
802
816

602
800
824
802
816
826
817
810
808
812
814
818
828

NUGGET ICE MAKER

BACKGROUND

Nugget ice makers include a rotating auger that scrapes ice off an interior surface of a mold body and that pushes the ice upward through holes formed in an extruder. Bearings may be used at a top and/or a bottom of the auger to support the rotation of the auger while limiting the radial and/or axial force exerted against the mold body. The bottom bearing may be located within the mold body and sealed against water intrusion. However, the water seal can fail resulting in possible contamination of the fluid that is frozen to form the ice nuggets.

SUMMARY

In an example embodiment, an ice maker is provided. The ice maker includes, but is not limited to, an evaporator body, an end cap, an auger, a bearing, and a bearing cup. The end cap is mounted to an end of the evaporator body and includes, but is not limited to, a cap bottom wall and a cap sidewall mounted to extend away from the cap bottom wall. The cap sidewall is positioned within the evaporator body. The auger includes, but is not limited to, an auger body, a connector rod, and a base. The auger body is mounted within the evaporator body and includes, but is not limited to, a first end and a second end that is opposite the first end. The connector rod includes, but is not limited to, a first rod end and a second rod end that is opposite the first rod end. The first rod end of the connector rod is mounted to the first end of the auger body and the second rod end of the connector rod is configured to mount to a motor. The base is mounted to extend away from the second end of the auger body. The bearing is mounted to the base of the auger within the cap sidewall of the end cap. The bearing cup includes, but is not limited to, an auger mounting shelf wall mounted to the base of the auger and a cup sidewall mounted to extend away from the auger mounting shelf wall. The cup sidewall surrounds the bearing and the cap sidewall of the end cap.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
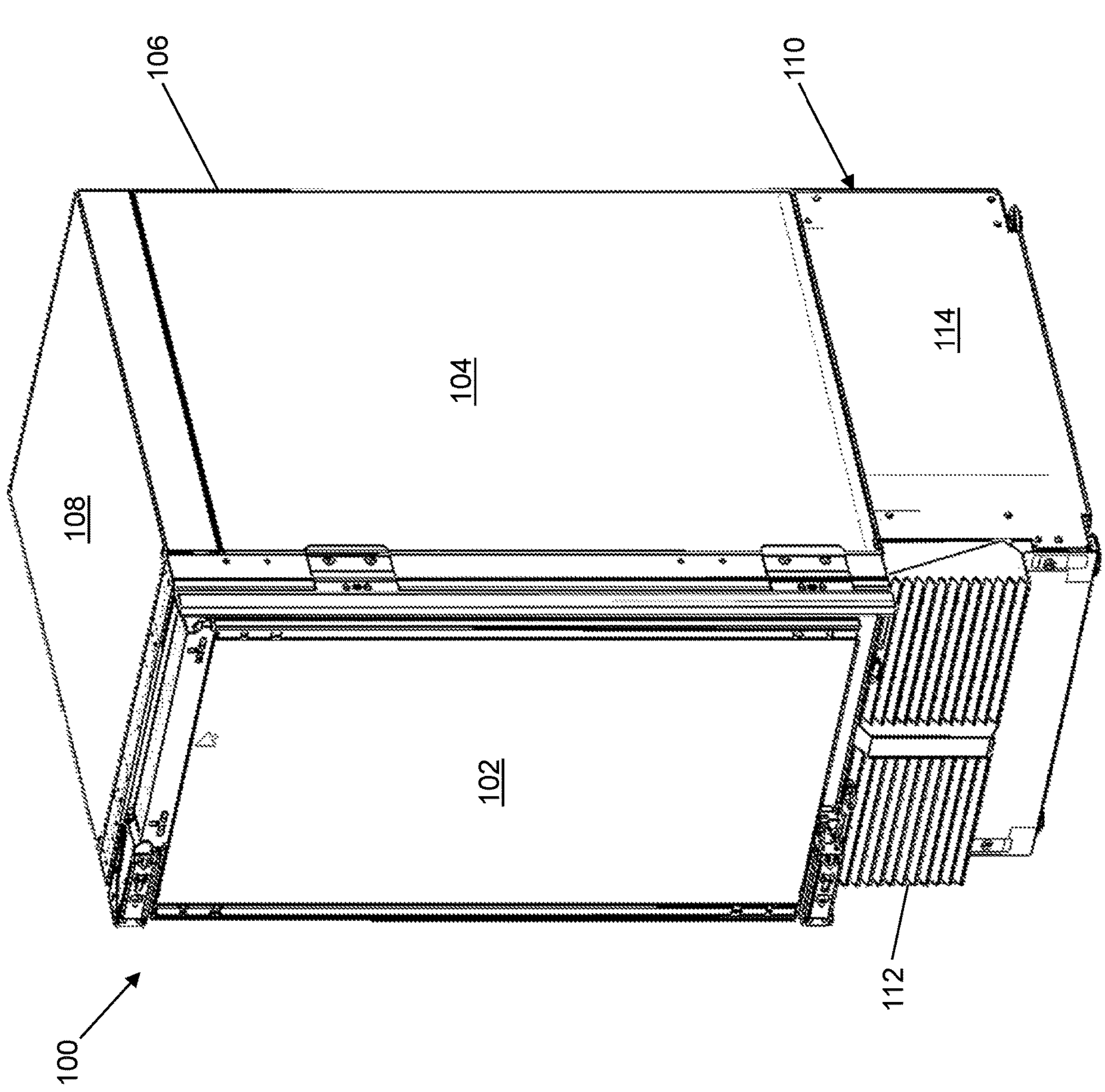
FIG. 1 depicts a right, front perspective view of an ice maker assembly in accordance with an illustrative embodiment.
Figure 2:
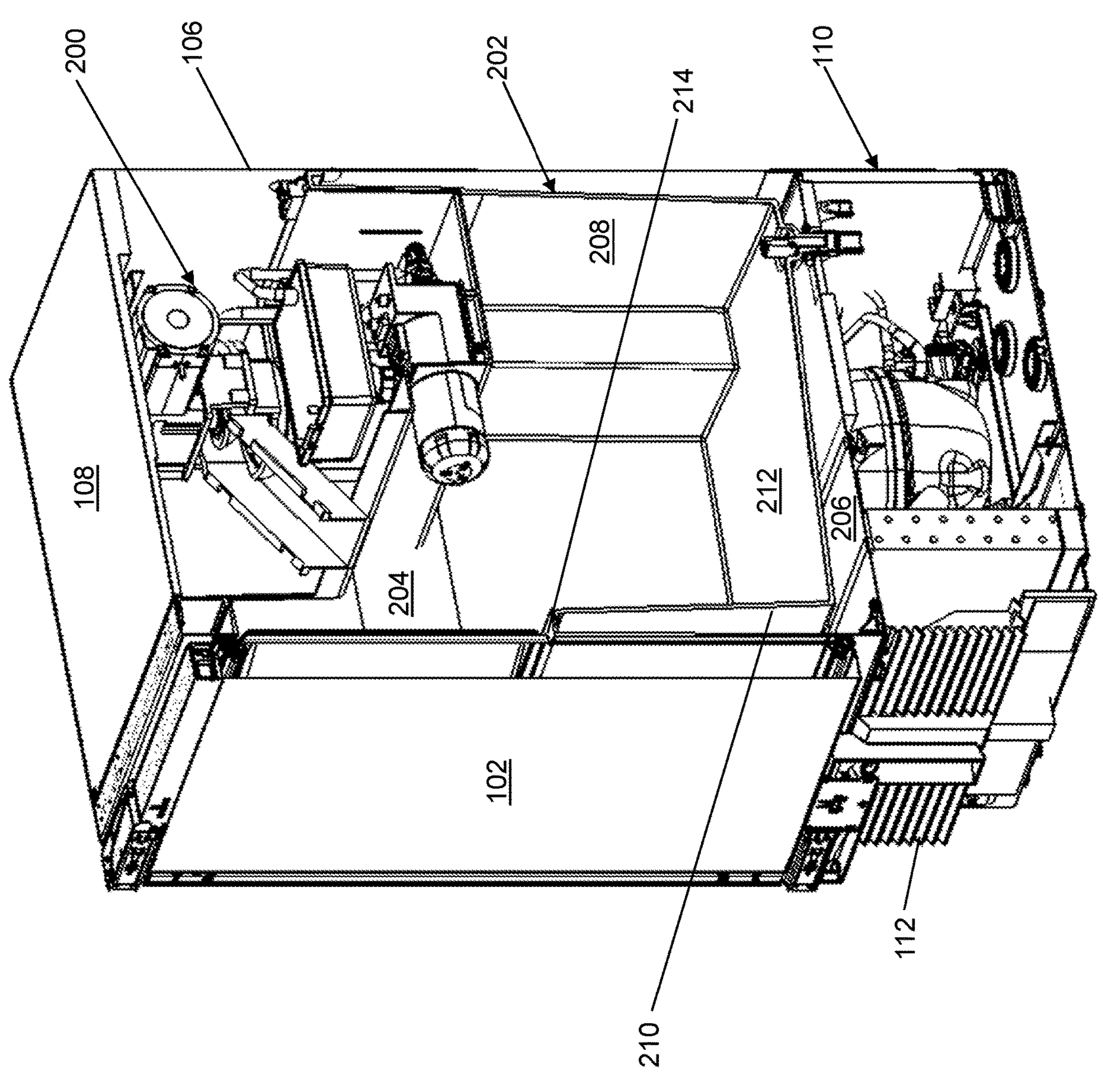
FIG. 2 depicts a right, front cross-sectional view of the ice maker assembly of FIG. 1 in accordance with an illustrative embodiment.

Referring to FIG. 1, a perspective view of an ice maker assembly 100 is shown in accordance with an illustrative embodiment. Referring to FIG. 2, a right, front cross-sectional view of ice maker assembly 100 is shown in accordance with an illustrative embodiment. In the illustrative embodiment, ice maker assembly 100 is a standalone ice making machine that includes an ice maker 200 that makes ice and directs the ice for storage in a bin 202 that may have various shapes and sizes. In an alternative embodiment, ice maker 200 may be mounted in a freezer compartment of a refrigerator.

Ice maker assembly 100 may include door 102, a right side wall 104, a back wall 106, a left side wall 204, a top wall 108, a bottom wall 206, and a base compartment 110. In the illustrative embodiment, door 102 is rotatably mounted to top wall 108 and bottom wall 206 adjacent left side wall 204 using two hinges. In an alternative embodiment, door 102 may be rotatably mounted to different walls of ice maker assembly 100 using a fewer or a greater number of hinges. In an alternative embodiment, door 102 may not be mounted to bin 202.

Door 102 provides access to bin 202 that holds ice. Bin 202 may generally be defined by top wall 108, right side wall 104, a bin back wall 208, left side wall 204, a bin front wall 210, and a bin bottom wall 212. Bin front wall 210 may include an aperture wall 214 that defines an opening through which ice may be withdrawn from bin 202 by a user. In the illustrative embodiment, aperture wall 214 defines a rectangular opening though other shapes may be used to define the aperture through which ice is withdrawn. In an alternative embodiment, bin 202 may be enclosed and withdrawn with the ice from an ice maker housing. When door 102 is in a closed position, ice cannot be withdrawn from bin 202.

The walls and door 102 that form ice maker assembly 100 are insulated walls that include insulation to assist in maintenance of the desired temperature in bin 202. Electrical wiring and various conduits may further be located in the insulated walls. For example, during a manufacturing process, a space between exterior walls of ice maker assembly 100 and an interior liner may be filled with an insulating foam material that provides insulation.

Use of directional terms, such as top, bottom, right, left, front, back, etc. are merely intended to facilitate reference to the various surfaces and elements of the described structures relative to the orientations shown in the drawings and are not intended to be limiting in any manner. For consistency, the components of ice maker assembly 100 are labeled such that door 102 defines a front of ice maker assembly 100.

Though shown in the illustrative embodiment as forming a generally rectangular shaped enclosure, ice maker assembly 100 may form any shaped enclosure including other polygons as well as circular or elliptical enclosures. As a result, door 102, the walls forming ice maker assembly 100, and other components may have any shape including other polygons as well as circular or elliptical shape.

Figure 3:
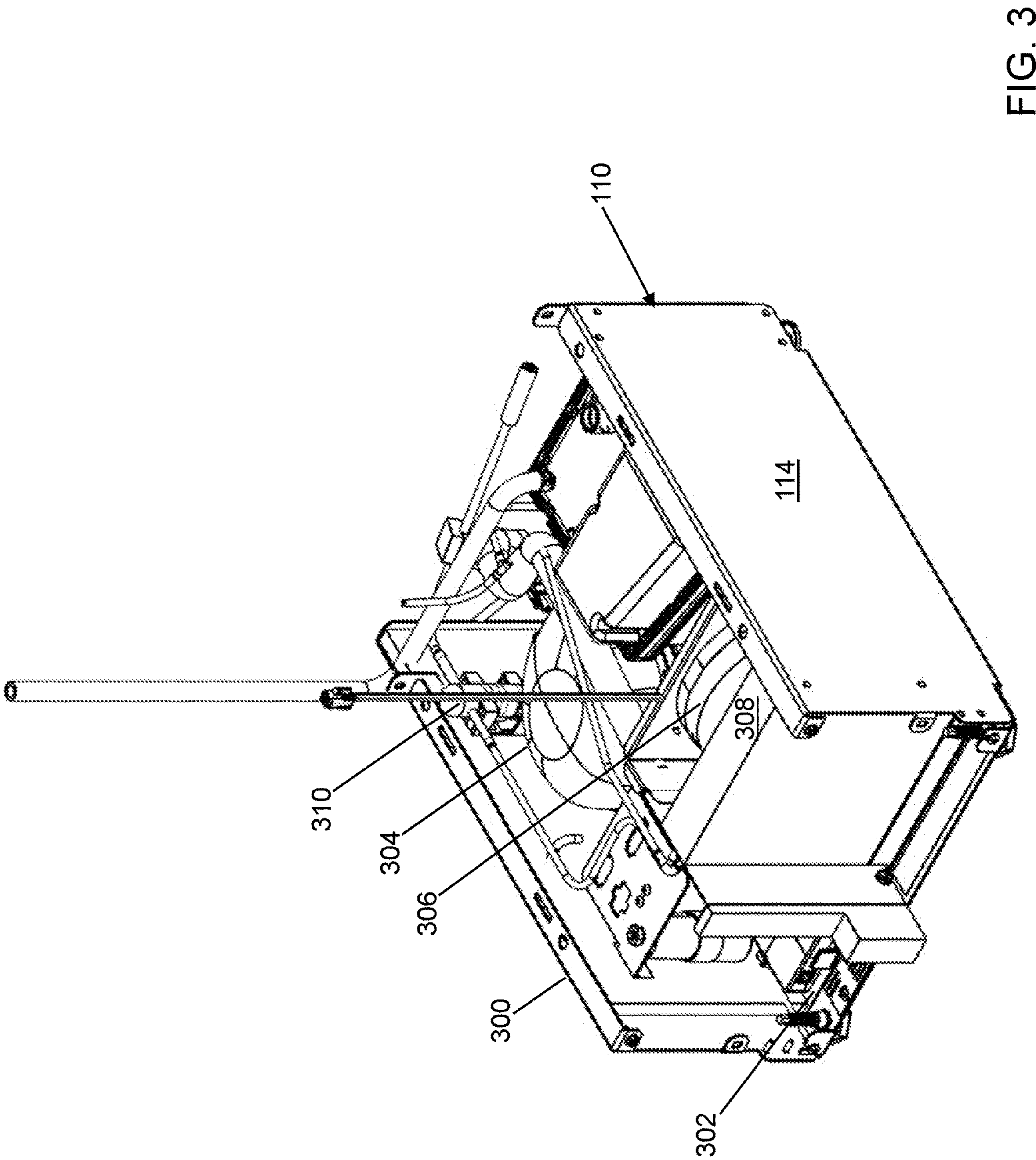
FIG. 3 depicts a right, front perspective view of a base compartment of the ice maker assembly of FIG. 1 in accordance with an illustrative embodiment.

Referring to FIG. 3, a right, front perspective view of base compartment 110 is shown in accordance with an illustrative embodiment. Base compartment 110 may include a vent plate 112 (shown referring to FIG. 1), a base right side wall 114, a base left side wall 300, and a base bottom wall 302. Base compartment 110 provides a housing for some of the refrigeration components of ice maker assembly 100. Base compartment 110 is mounted below bin 202 though base compartment 110 may be positioned at alternative locations relative to bin 202 in alternative embodiments. For example, base compartment 110 may be mounted above bin 202 or behind bin 202 in alternative embodiments. In the illustrative embodiment, bottom wall 206 forms a top wall of base compartment 110. Vent plate 112 includes louvers mounted across a face thereof to provide a flow of ambient air across the refrigeration components of ice maker assembly 100 mounted within base compartment 110.

The refrigeration components of ice maker assembly 100 cool an interior surface 700 of an evaporator body 410 to a temperature that promotes the formation of ice as understood by a person of skill in the art. The refrigeration components may include a compressor, a condenser, an evaporator, a drier, etc., mounted to various walls of ice maker assembly 100 either within the walls, on an exterior of the walls relative to ice maker assembly 100, and/or on an interior of the walls relative to ice maker assembly 100. For example, the refrigeration components mounted within base compartment 110 may include a compressor 304, a fan 306, a condenser 308, and a drier 310. Various tubing may connect the refrigeration components to provide a refrigeration cycle as understood by a person of skill in the art.

Figure 4A:
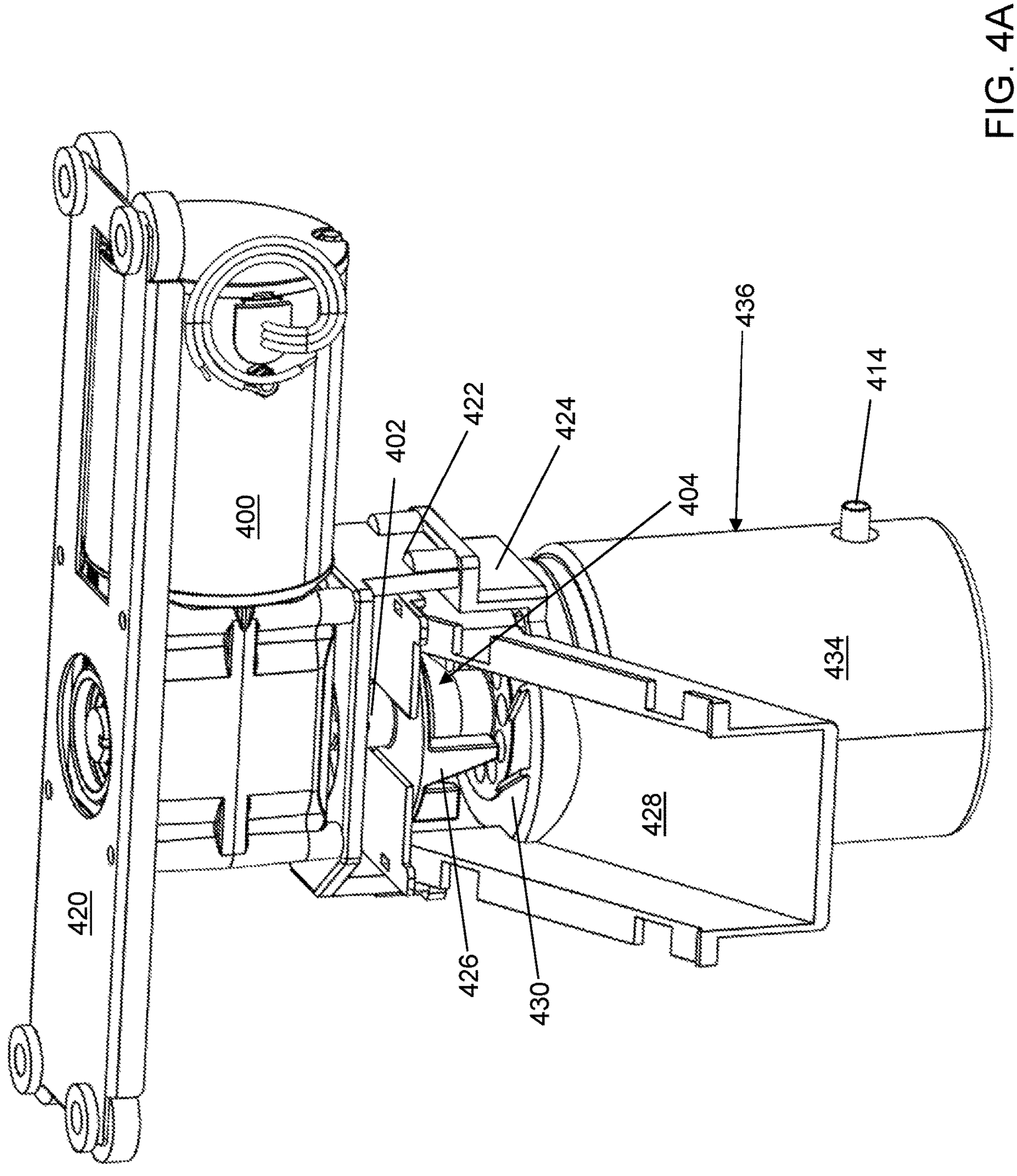
FIG. 4A depicts a top, front perspective view of a nugget ice maker of the ice maker assembly of FIG. 1 in accordance with an illustrative embodiment.
Figure 4B:
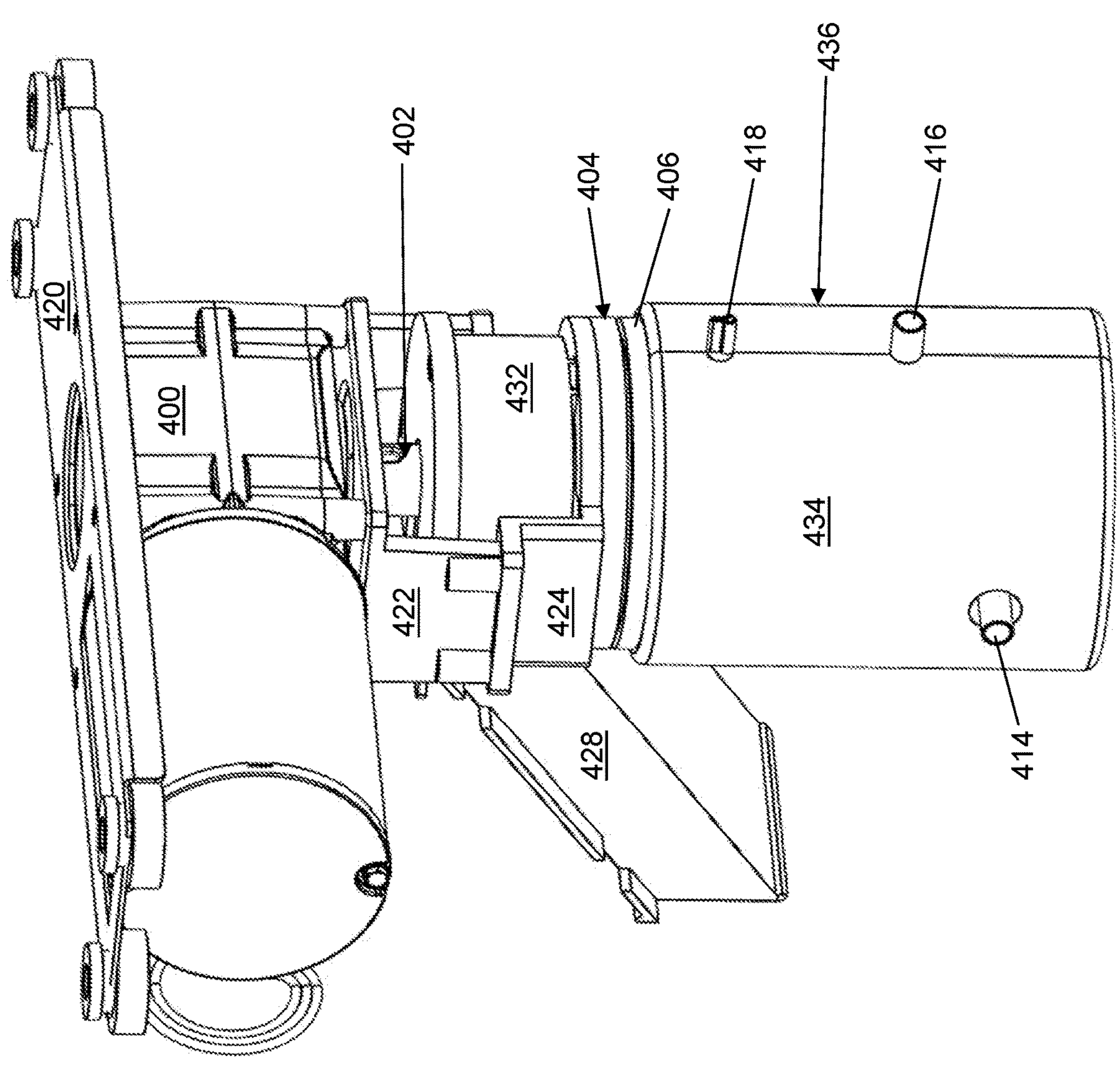
FIG. 4B depicts a back perspective view of the nugget ice maker of FIG. 4A in accordance with an illustrative embodiment.
Figure 4C:
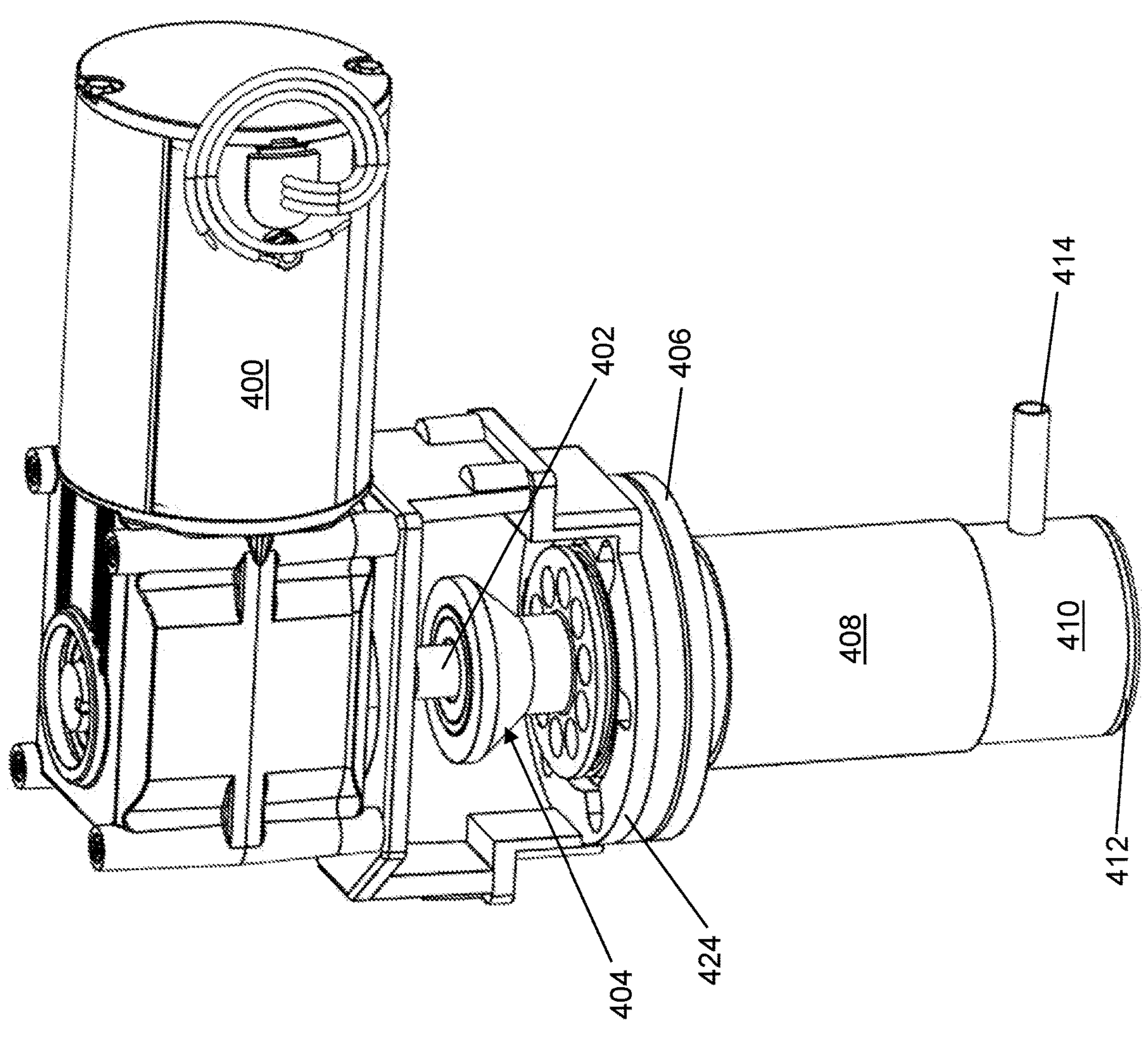
FIG. 4C depicts a top, front perspective view of some components of the nugget ice maker of FIG. 4A in accordance with an illustrative embodiment.
Figure 4D:
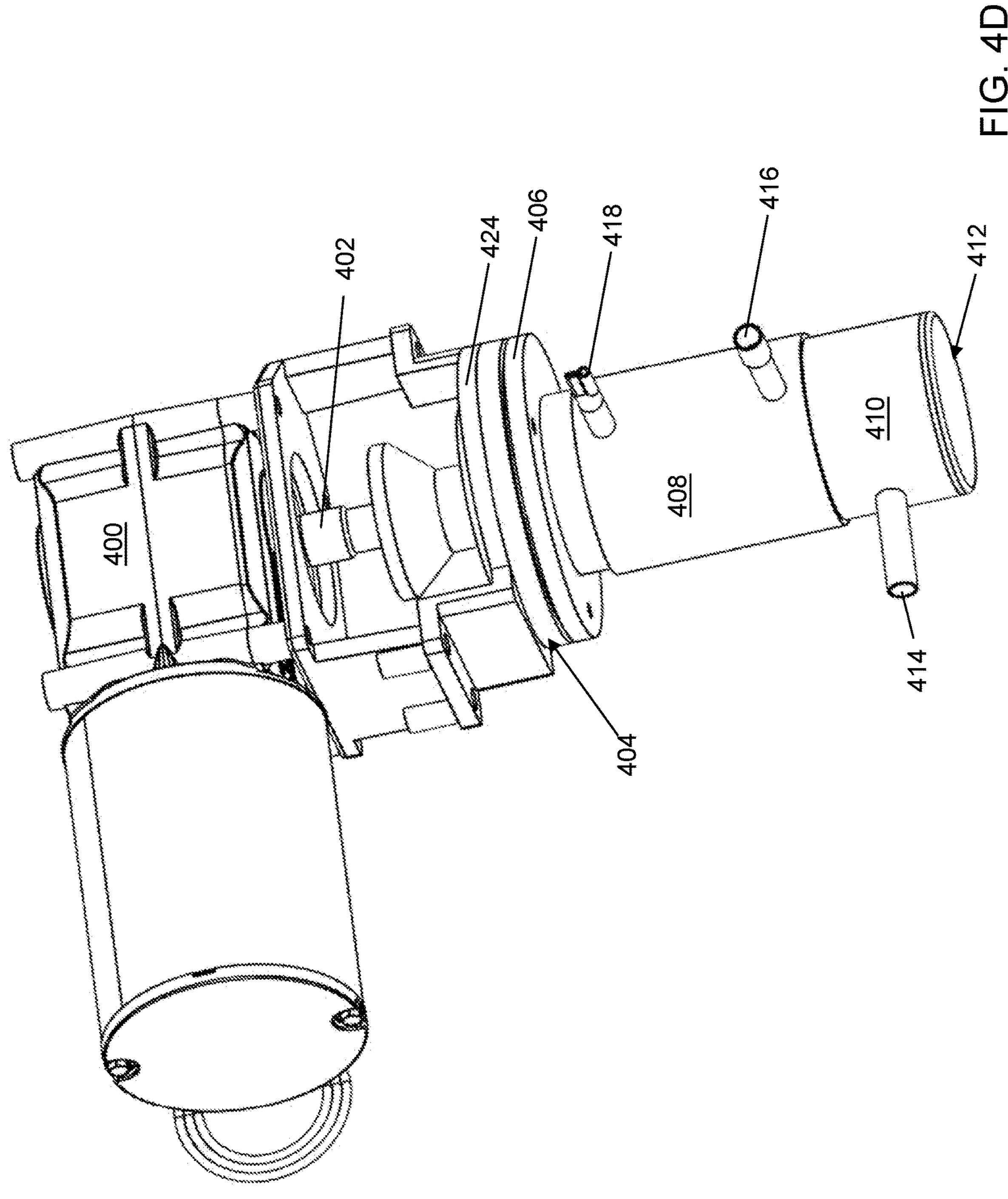
FIG. 4D depicts a bottom, back perspective view of the nugget ice maker of FIG. 4C in accordance with an illustrative embodiment.
Figure 5:
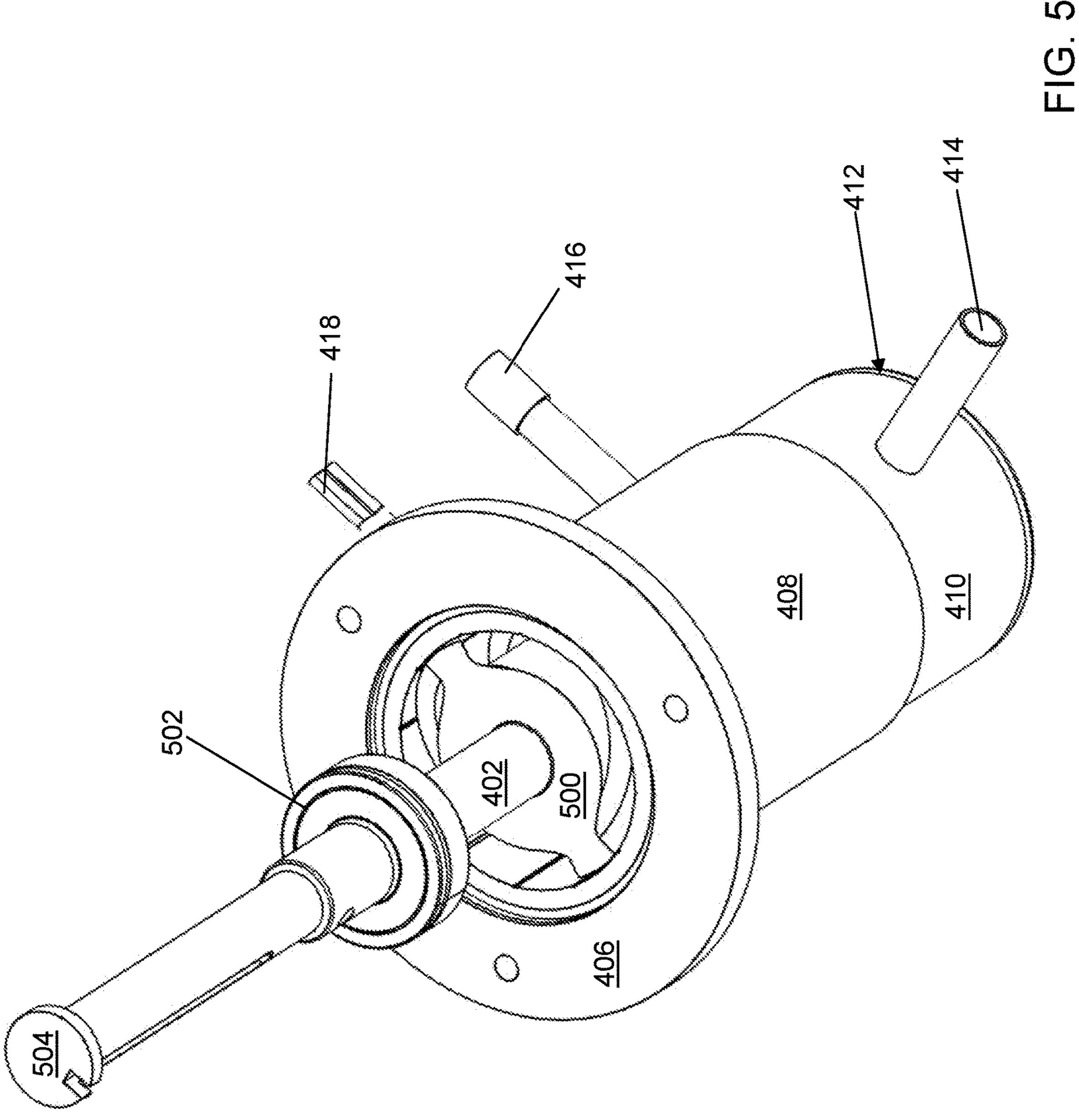
FIG. 5 depicts a top perspective view of some components of the nugget ice maker of FIG. 4A in accordance with an illustrative embodiment.

Referring to FIG. 4A, a top, front perspective view of ice maker 200 is shown in accordance with an illustrative embodiment. Referring to FIG. 4B, a back perspective view of ice maker 200 is shown in accordance with an illustrative embodiment. Referring to FIG. 4C, a top, front perspective view of some components of ice maker 200 are shown in accordance with an illustrative embodiment. Referring to FIG. 4D, a bottom, back perspective view of some components of ice maker 200 are shown in accordance with an illustrative embodiment. Referring to FIG. 5, a top, right perspective view of some components of ice maker 200 are shown in accordance with an illustrative embodiment. In the illustrative embodiment, ice maker 200 is a nugget ice maker that forms a nugget of ice using an extrusion process. The nuggets may have various shapes and sizes.

Ice maker 200 may include a motor assembly 400, a mounting bracket 420, a top flange 422, a mounting plate 424, an ice sweeper 426, an ice chute 428, an ice diverter plate 430, an ice chute back wall 432, and an ice forming assembly 436. Mounting bracket 420 is configured to mount ice maker 200 to top wall 108 of ice maker assembly 100 though other mounting mechanisms may be used in an alternative embodiment. In the illustrative embodiment, motor assembly 400 is mounted to mounting bracket 420 though mounting bracket 420 may be mounted to other components of ice maker 200 to mount ice maker 200 to top wall 108 of ice maker assembly 100. Though in the illustrative embodiment mounting bracket 420 is mounted to top wall 108 of ice maker assembly 100, ice maker 200 may be mounted to a different wall of ice maker assembly 100 in an alternative embodiment.

In the illustrative embodiment, a drive rod 504 is connected between motor assembly 400 and a connector rod 402 of an auger 500 of ice forming assembly 436. A rotor of a motor (not shown) of motor assembly 400 is connected to rotate drive rod 504 as understood by a person of skill in the art. Drive rod 504 is connected to connector rod 402 such that connector rod 402 rotates with drive rod 504. For example, a control pin (not shown) may mount connector rod 402 to drive rod 504. Connector rod 402 is mounted to auger 500 such that auger 500 rotates with connector rod 402. For example, connector rod 402 may be fastened to auger 500 using a fastener such as a screw, rivet, adhesive, etc., may be welded to auger 500, may be integrally formed with auger 500, etc.

Top flange 422 is mounted to motor assembly 400, for example, using a fastener such as a screw, rivet, adhesive, etc. Mounting plate 424 is mounted to top flange 422, for example, using a fastener such as a screw, rivet, adhesive, etc. Mounting plate 424 and top flange 422 mount ice forming assembly 436 to motor assembly 400 in the illustrative embodiment though other mounting mechanisms may be used in an alternative embodiment.

Ice forming assembly 436 may include connector rod 402, an extruder 404, an extruder cap 406, an insulation sleeve 434, an evaporator sleeve 408, evaporator body 410, an end cap 412, a fluid intake tube 414, a refrigerant intake tube 416, a refrigerant outtake tube 418, auger 500, and a top bearing 502. Top bearing 502 is mounted between extruder 404 and connector rod 402 of auger 500. For example, top bearing 502 may be a ball bearing as understood by a person of skill in the art.

Extruder cap 406 is mounted between extruder 404 and insulation sleeve 434. Insulation sleeve 434 surrounds evaporator sleeve 408 and evaporator body 410 and may include an insulating material to assist in maintaining an interior of evaporator body 410 at or below freezing. A top end of evaporator body 410 is mounted within extruder cap 406. Evaporator sleeve 408 is mounted circumferentially between insulation sleeve 434 and evaporator body 410 to cover a top cylinder wall 702 (shown referring to FIG. 7A) and a center cylinder wall 704 (shown referring to FIG. 7A) of evaporator body 410.

End cap 412 is mounted to a bottom end of a bottom cylinder wall 706 (shown referring to FIG. 7A) of evaporator body 410. End cap 412 seals the bottom end of evaporator body 410 so that fluid does not leak from evaporator body 410. For example, end cap 412 may be fastened to the bottom end of evaporator body 410 using a fastener such as a screw, rivet, adhesive, etc., may be welded to the bottom end of evaporator body 410, may be integrally formed with the bottom end of evaporator body 410, etc.

Figure 6A:
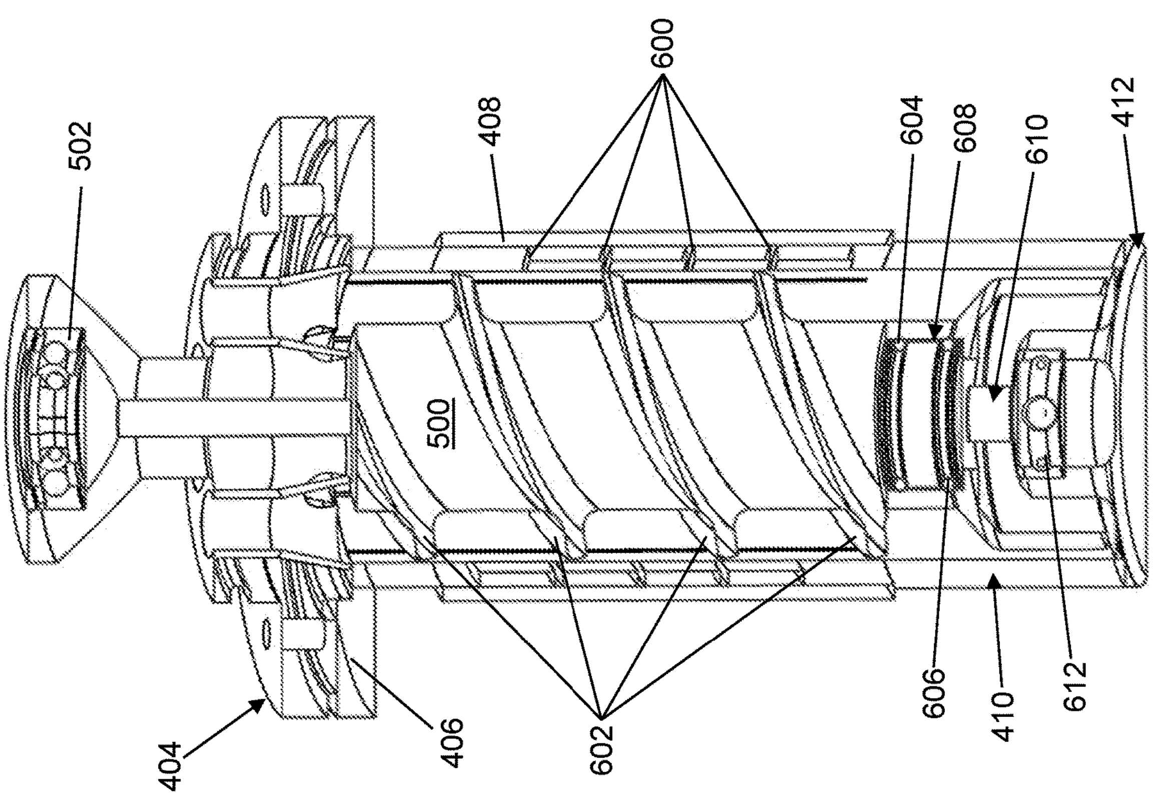
FIG. 6A depicts a vertical cross-sectional view of an ice forming assembly of FIG. 5 without a control rod in accordance with an illustrative embodiment.
Figure 6B:
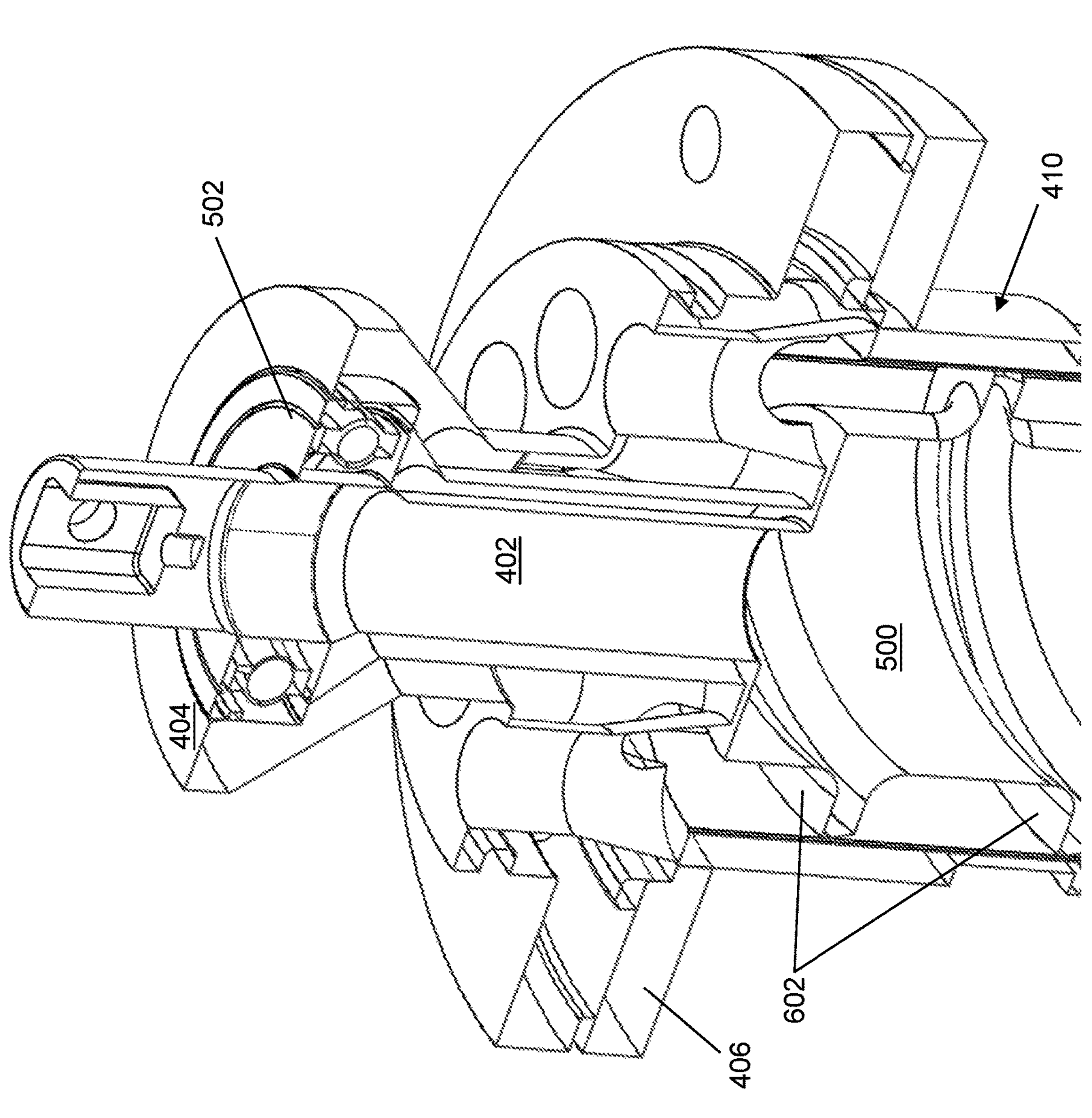
FIG. 6B depicts a zoomed vertical cross-sectional view of a top portion of the ice forming assembly of FIG. 6A in accordance with an illustrative embodiment.

Referring to FIG. 6A, a side cross-sectional view of ice forming assembly 436 of ice maker 200 is shown without connector rod 402 in accordance with an illustrative embodiment. Referring to FIG. 6B, a zoomed perspective cross-sectional view of ice forming assembly 436 of ice maker 200 is shown in accordance with an illustrative embodiment. Ice forming assembly 436 may further include a first o-ring 604, a second o-ring 606, a bearing cup 608, an adapter 610, a bottom bearing 612, and an auger pin 1000 (shown referring to FIG. 10).

Figure 7B:
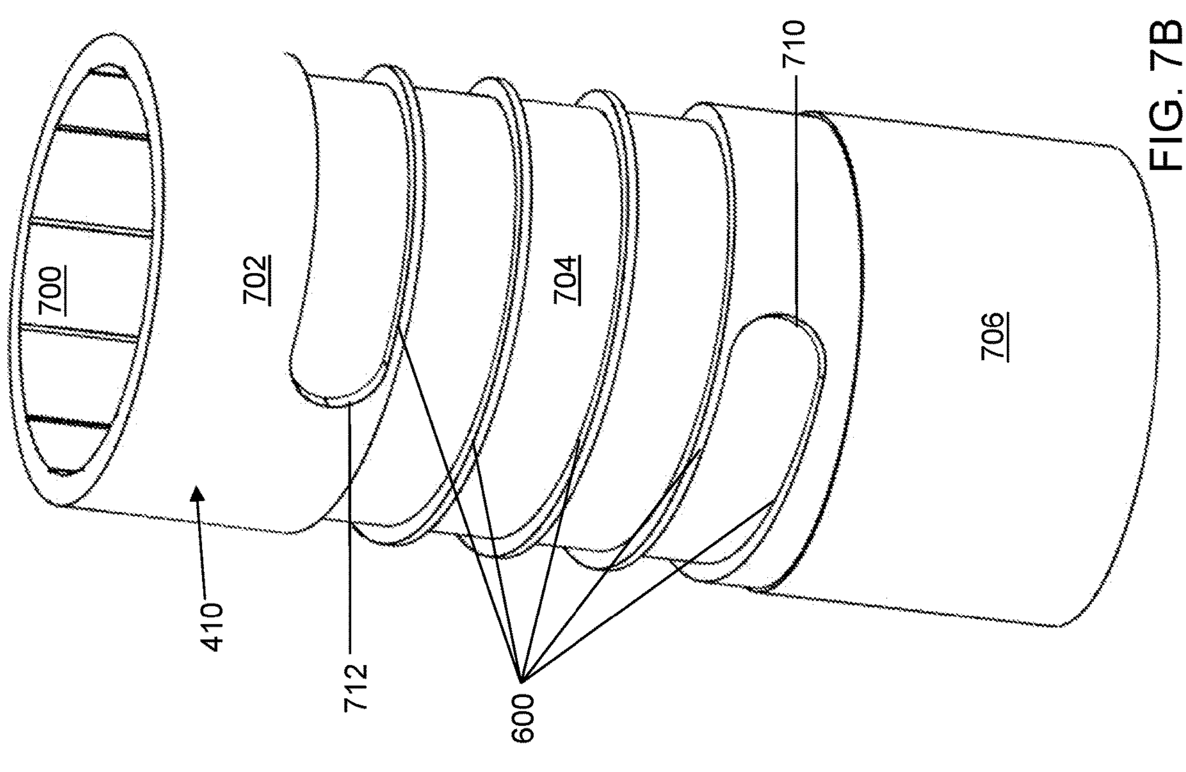
FIG. 7B depicts a perspective view of the evaporator body of FIG. 7A in accordance with an illustrative embodiment.
Figure 7A:
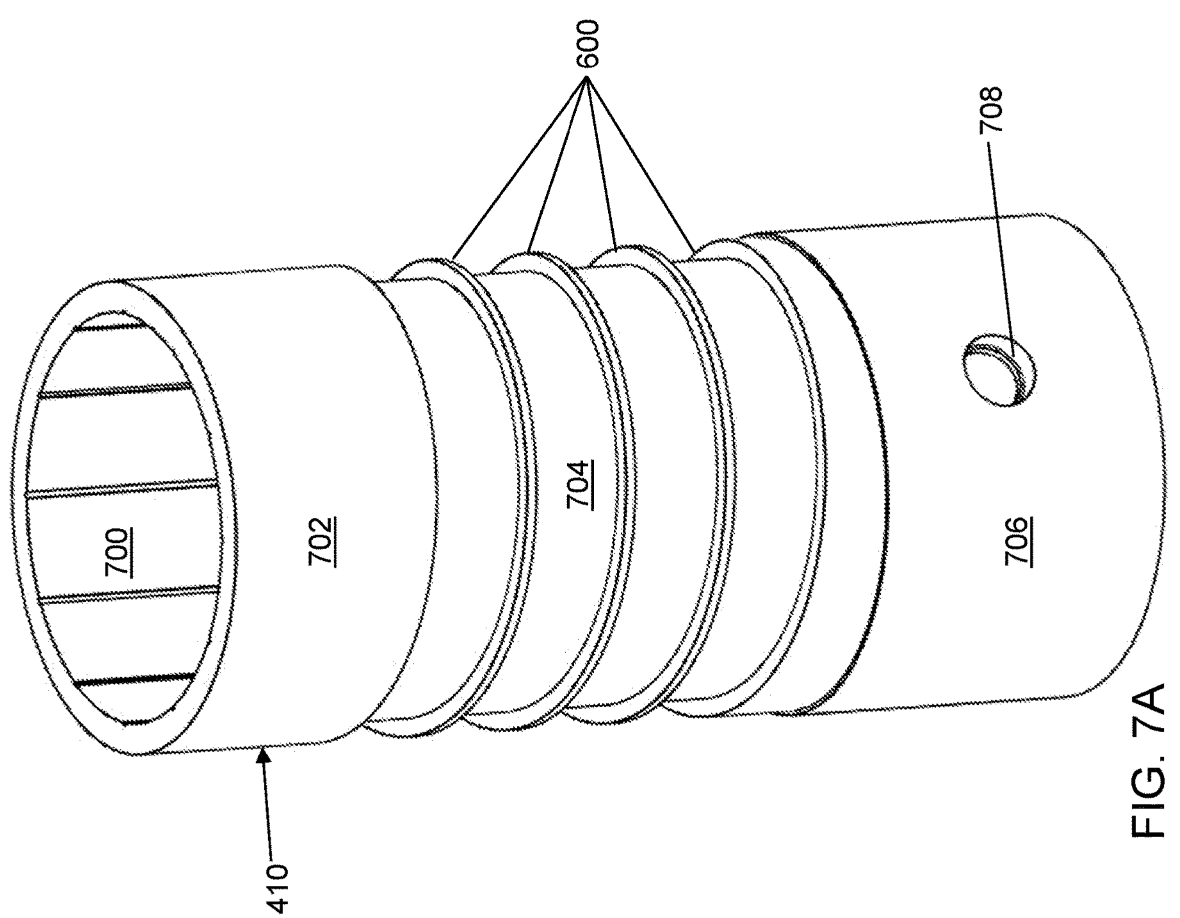
FIG. 7A depicts a perspective view of an evaporator body of the ice forming assembly of FIG. 6A in accordance with an illustrative embodiment.

Referring to FIG. 7A, a first perspective view of evaporator body 410 is shown in accordance with an illustrative embodiment. Referring to FIG. 7B, a second perspective view of evaporator body 410 is shown in accordance with an illustrative embodiment. Evaporator body 410 may include a plurality of evaporator flights 600, interior surface 700, top cylinder wall 702, center cylinder wall 704, a cylinder wall 706, and a fluid intake aperture wall 708. Interior surface 700 is a continuous inner surface of top cylinder wall 702, center cylinder wall 704, and bottom cylinder wall 706.

Center cylinder portion 704 is formed between top cylinder portion 702 and bottom cylinder portion 704 with a reduced circumference relative to top cylinder portion 702 and bottom cylinder portion 704 in the illustrative embodiment. Evaporator flights 600 are formed to extend outward from center cylinder portion 704 between top cylinder portion 702 and bottom cylinder portion 704 and toward an interior surface of evaporator sleeve 408. For example, evaporator flights 600 may extend outward a distance similar to a circumference of top cylinder portion 702 and bottom cylinder portion 704 to form a continuous channel.

A refrigerant may be provided to an exterior of center cylinder portion 704 through refrigerant intake tube 416 that is positioned adjacent a channel start wall 710 of the continuous channel. The refrigerant exits through refrigerant outtake tube 418 that is positioned adjacent a channel end wall 712 of the continuous channel after traveling circumferentially around evaporator body 410 between the exterior of center cylinder portion 704 and the interior surface of evaporator sleeve 408. The plurality of evaporator flights 600 that define the channel direct the flow of the refrigerant between channel start wall portion 710 and channel end wall 712. The refrigerant causes interior surface 700 to freeze the fluid received through fluid intake tube 414. Channel start wall 710, channel end wall 712, and the plurality of evaporator flights 600 maintain the refrigerant within the continuous channel between the exterior of center cylinder portion 704 and the interior surface of evaporator sleeve 408.

Fluid intake aperture wall 708 forms an aperture through bottom cylinder wall 706. Fluid intake aperture wall 708 is sized, shaped, and positioned so that fluid intake tube 414 can be inserted within the aperture to provide fluid to interior surface 700 of evaporator body 410.

Though described as including multiple elements to describe the characteristics of evaporator body 410, evaporator body 410 may be formed of one or more elements that are mounted to each other. As an example, evaporator body 410 may be formed as a single element using a molding or thermoforming process.

Figures 8A, 8B:
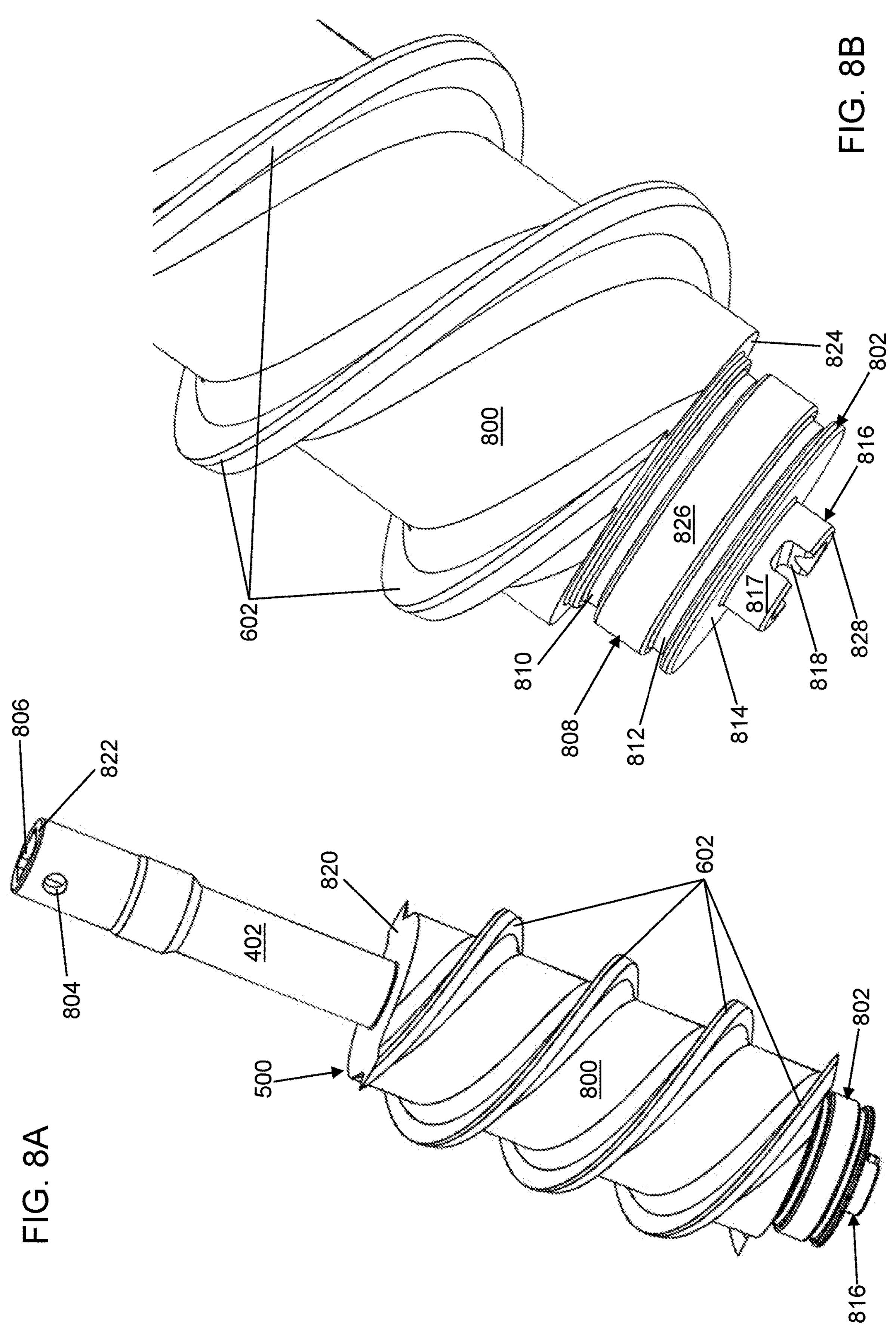
FIG. 8A depicts a perspective view of an auger of the ice forming assembly of FIG. 6A in accordance with an illustrative embodiment.
FIG. 8B depicts a zoomed perspective view of a bottom portion of the auger of FIG. 8A in accordance with an illustrative embodiment.

Referring to FIG. 8A, a perspective view of auger 500 is shown in accordance with an illustrative embodiment. Referring to FIG. 8B, a zoomed perspective view of a bottom portion of auger 500 is shown in accordance with an illustrative embodiment. Auger 500 may include connector rod 402, an auger body 800, an auger base 802, and a foot 816. Auger body 800, auger base 802, and foot 816 are mounted within evaporator body 410. Auger body 800 has a horizontal cross-section that is circular though auger body 800 may have a different horizontal cross-sectional shape in an alternative embodiment.

Connector rod 402 is mounted to a top surface 820 of auger body 800 and extends outward away from top surface 820 toward drive rod 504 that is driven by the motor. Connector rod 402 extends outward generally perpendicular relative to top surface 820. Connector rod 402 has a horizontal cross-section that is circular with a smaller circumference than auger body 800 though connector rod 402 may have a different horizontal cross-sectional shape in an alternative embodiment.

Connector rod 402 may include a drive pin aperture wall 804 and a drive rod aperture wall 806. Drive rod aperture wall 806 is formed in a top surface 822 of connector rod 402 on a second end of connector rod 402 that is opposite a first end of connector rod 402 that mounts to top surface 820 of auger body 800. Drive rod aperture wall 806 is formed at least partially within connector rod 402 and is sized and shaped to accept insertion of a tip of drive rod 504 therein.

Drive pin aperture wall 804 is formed through connector rod 402 and is sized, shaped, and positioned for insertion of the control pin. The control pin is further inserted into drive rod 504 to mount drive rod 504 to connector rod 402 so that drive rod 504 and connector rod 402 rotate together. Other mounting mechanisms may be used in alternative embodiments such as other fasteners, adhesive, welding, etc.

A plurality of auger flights 602 mount to auger body 800 to extend outward away from auger body 800 toward interior surface 700 of evaporator body 410. The plurality of auger flights 602 encircle auger body 800, for example, forming an outward helix along the length of auger body 800. The outward extent of the plurality of auger flights 602 from auger body 800 is selected such that the plurality of auger flights 602 scrape ice from interior surface 700 of evaporator body 410 when auger 500 is rotated. The plurality of auger flights 602 are shaped to move the scraped ice upward toward extruder 404 though the plurality of auger flights 602 could be shaped to move the scraped ice in a different direction relative to auger 500. The plurality of auger flights 602 may be a single continuous flight. The plurality of auger flights 602 may be mounted to auger body 800 using various mounting mechanisms such as a fastener, adhesive, welding, thermoforming, etc.

Auger base 802 may include a base body 808, a first channel 810, a second channel 812, and a mounting surface 814. Base body 808 is mounted to a bottom surface 824 of auger body 800 and extends outward away from bottom surface 824 of auger body 800 toward end cap 412 when ice maker 200 is assembled. Base body 808 extends outward generally perpendicular from bottom surface 824. Base body 808 has a vertical cross-section that is circular with a smaller circumference than auger body 800 in the illustrative embodiment.

First channel 810 and second channel 812 are formed in an exterior surface 826 of base body 808 to form channels sized and shaped to accept first o-ring 604 and second o-ring 606 therein, respectively, to provide a seal between auger base 802 and bearing cup 608 in the illustrative embodiment.

Foot 816 may include a foot sidewall 817, a foot bottom surface 828, and a pin channel 818. Foot sidewall 817 is mounted to mounting surface 814 and extends outward away from mounting surface 814 toward end cap 412. Foot sidewall 817 extends outward generally perpendicular from mounting surface 814. Foot sidewall 817 has a vertical cross-section that is circular with a smaller circumference than base body 808.

Pin channel 818 is formed in foot sidewall 817 to form a channel sized and shaped to accept auger pin 1000 therein to mount auger 500 to adapter 610 in the illustrative embodiment. Pin channel 818 extends radially across foot sidewall 817 forming a depression in foot sidewall 817. Foot bottom surface 828 may extend across foot sidewall 817 except where the depression of pin channel 818 is formed.

Though described as including multiple elements to describe the characteristics of auger 500, auger 500 may be formed of one or more elements that are mounted to each other. As an example, auger 500 may be formed as a single element using a molding or thermoforming process.

Figure 9A:
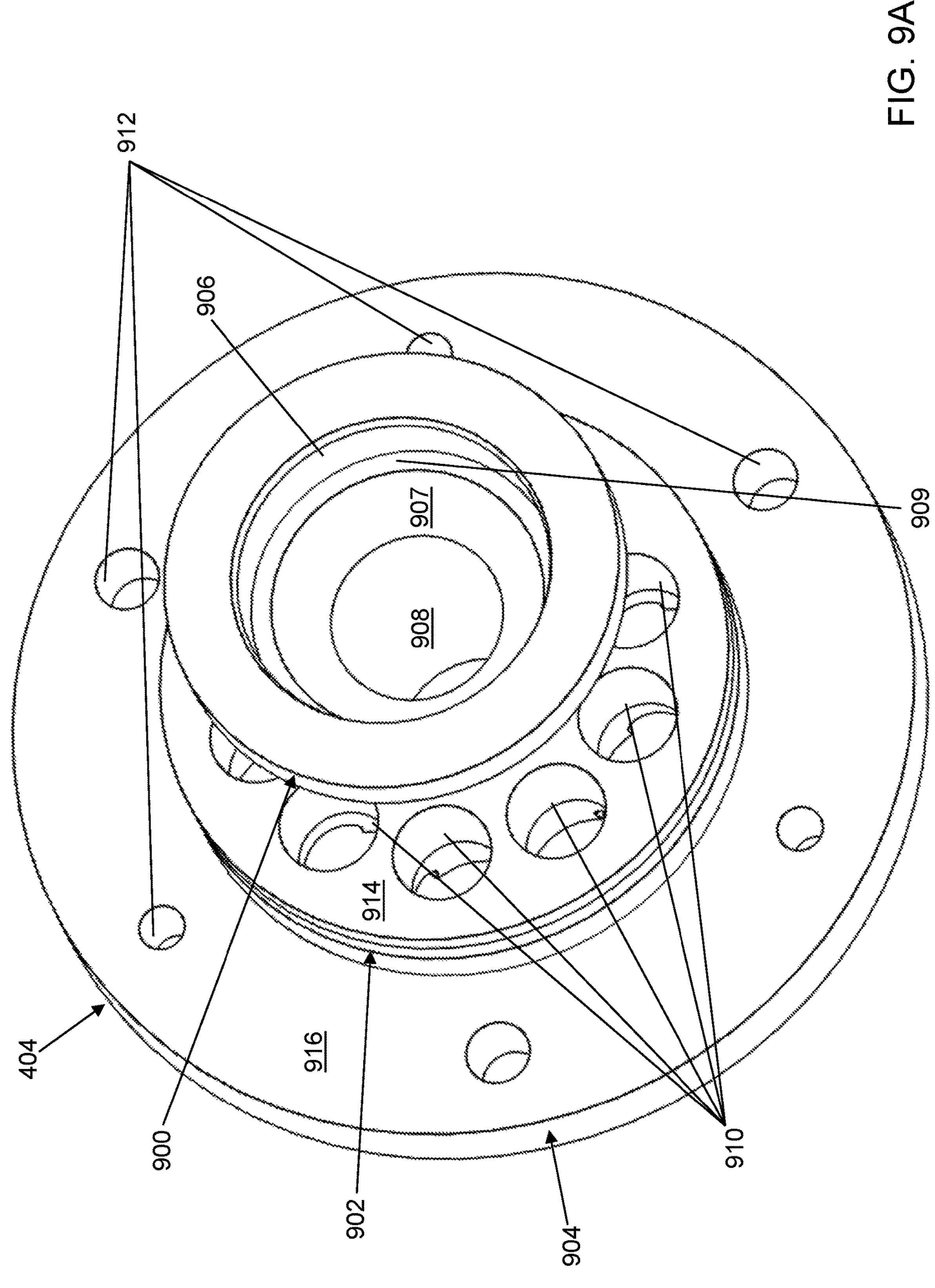
FIG. 9A depicts a top perspective view of an extruder of the ice forming assembly of FIG. 6A in accordance with an illustrative embodiment.
Figure 9B:
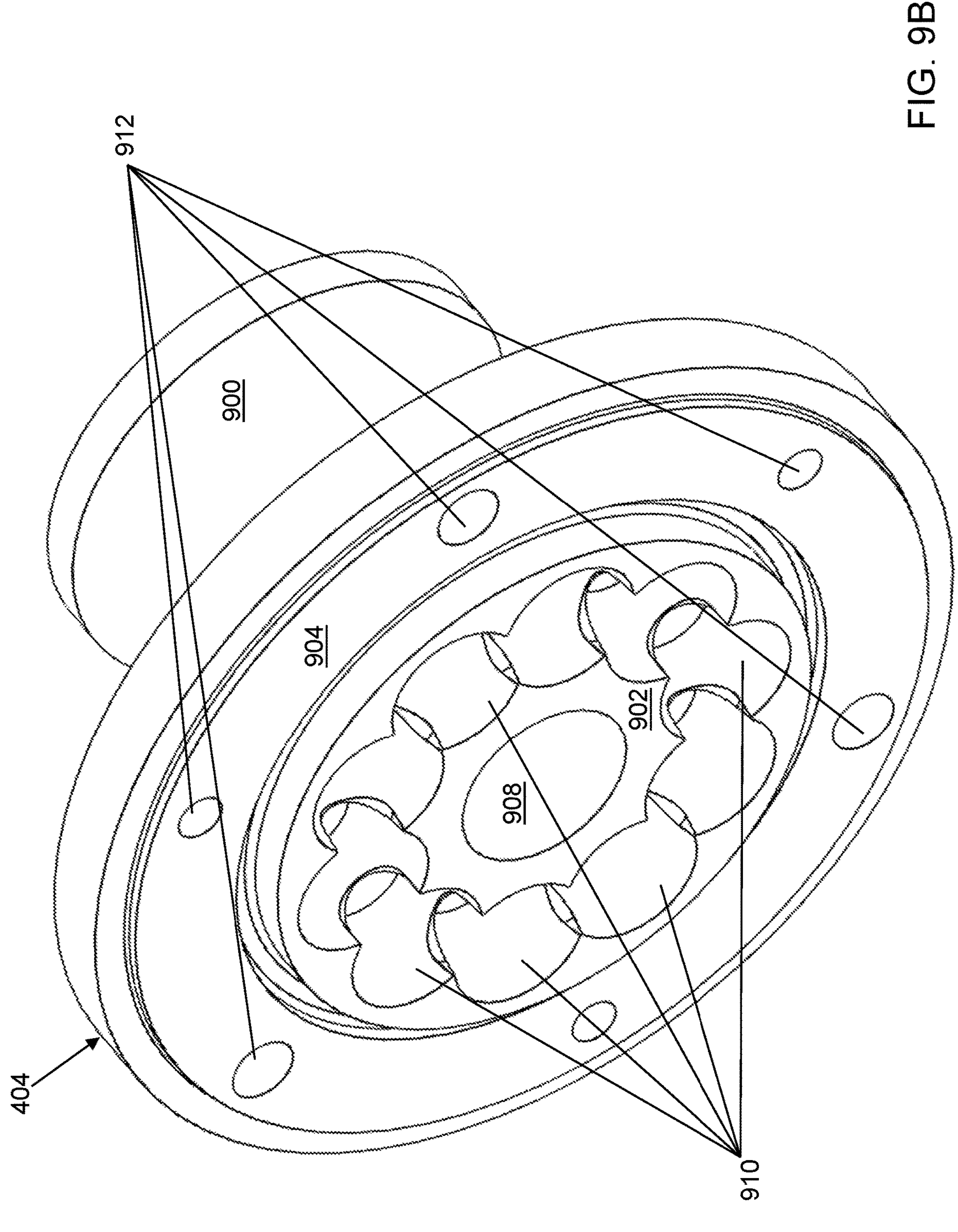
FIG. 9B depicts a bottom perspective view of the extruder of FIG. 9A in accordance with an illustrative embodiment.

Referring to FIG. 9A, a top perspective view of extruder 404 is shown in accordance with an illustrative embodiment. Referring to FIG. 9B, a bottom perspective view of extruder 404 is shown in accordance with an illustrative embodiment. Extruder 404 may include an extruder head 900, an extrusion disk 902, and an extrusion mounting disk 904. Extruder head 900 may include a top bearing abutment wall 906, a top bearing support wall 907, an upper portion of an auger aperture wall 908, and a transition wall 909.

Auger aperture wall 908 forms an aperture vertically through the upper portion of extruder head 900, through extrusion disk 902, and through extrusion mounting disk 904. Auger aperture wall 908 has a vertical cross-section that is sized and shaped to accept connector rod 402 therethrough.

An aperture through a center of extruder head 900 is defined by the upper portion of auger aperture wall 908, transition wall 909, and top bearing abutment wall 906. A first aperture circumference defined by the upper portion of auger aperture wall 908 is smaller than a second aperture circumference defined by top bearing abutment wall 906. A third aperture circumference defined by transition wall 909 varies linearly from the first aperture circumference to the second aperture circumference in the illustrative embodiment. The first aperture circumference is selected to accept connector rod 402. The second aperture circumference is selected to accept top bearing 502 such that top bearing 502 encircles connector rod 402 of auger 500. Top bearing support wall 907 extends inward from transition wall 909 to form a shelf on which top bearing 502 is supported.

An exterior wall of extruder head 900 is mounted to a top surface 914 of extrusion disk 902 and extends outward away from top surface 914. The exterior wall of extruder head 900 extends outward generally perpendicular from top surface 914.

Extrusion aperture walls 910 are formed through extrusion disk 902 and extrusion mounting disk 904. Auger 500 pushes the scraped ice into apertures defined by extrusion aperture walls 910. Extrusion aperture walls 910 are aligned with the plurality of auger flights 602 to receive the scraped ice. Ice sweeper 426 is mounted to rotate with auger 500 and to cut the ice that exits extrusion aperture walls 910 to form the ice nuggets. Ice diverter plate 430 directs the ice cut by ice sweeper 426 toward ice chute 428. Ice chute back wall 432 directs the cut ice toward ice chute 428. The ice falls down ice chute 428 by gravity and is directed into bin 202. Though not shown, an ice backstop as described in U.S. patent application Ser. No. 17/866,698 filed Jul. 18, 2022 and assigned to the assignee of the present application may be mounted in front of ice chute 428 to further direct the ice thereby providing a more even distribution of the ice within bin 202.

Fastener aperture walls 912 are formed through extrusion mounting disk 904. Fasteners such as screws, rivets, etc. may be inserted within fastener aperture walls 912 to mount extruder 404 between mounting plate 424 and extruder cap 406 though a different mounting mechanism may be used in an alternative embodiment.

Though described as including multiple elements to describe the characteristics of extruder 404, extruder 404 may be formed of one or more elements that are mounted to each other. As an example, extruder 404 may be formed as a single element using a molding or thermoforming process.

Figure 10A:
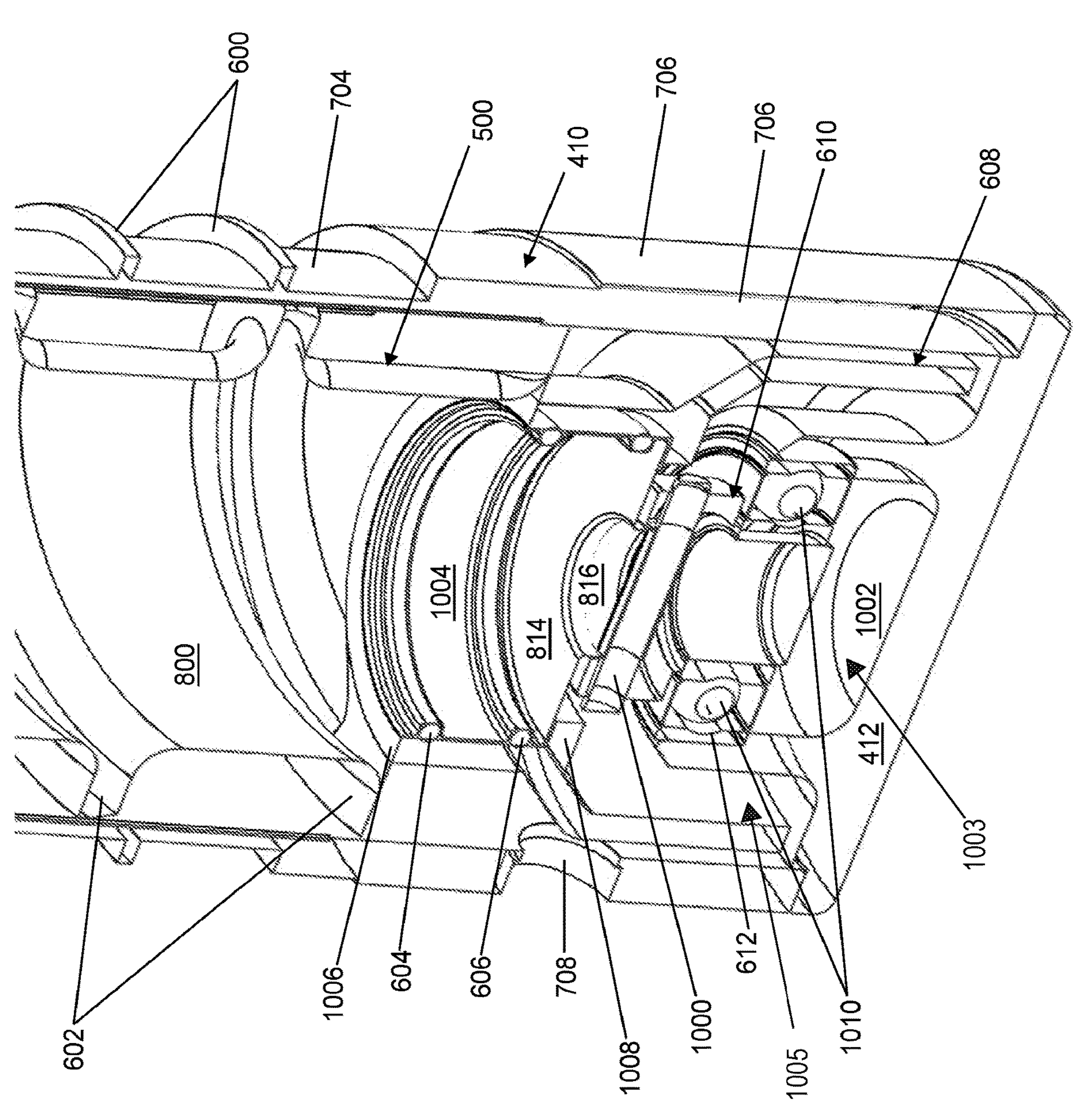
FIG. 10A depicts a zoomed vertical cross-sectional view of a bottom portion of the ice forming assembly of FIG. 6A in accordance with an illustrative embodiment.
Figure 10B:
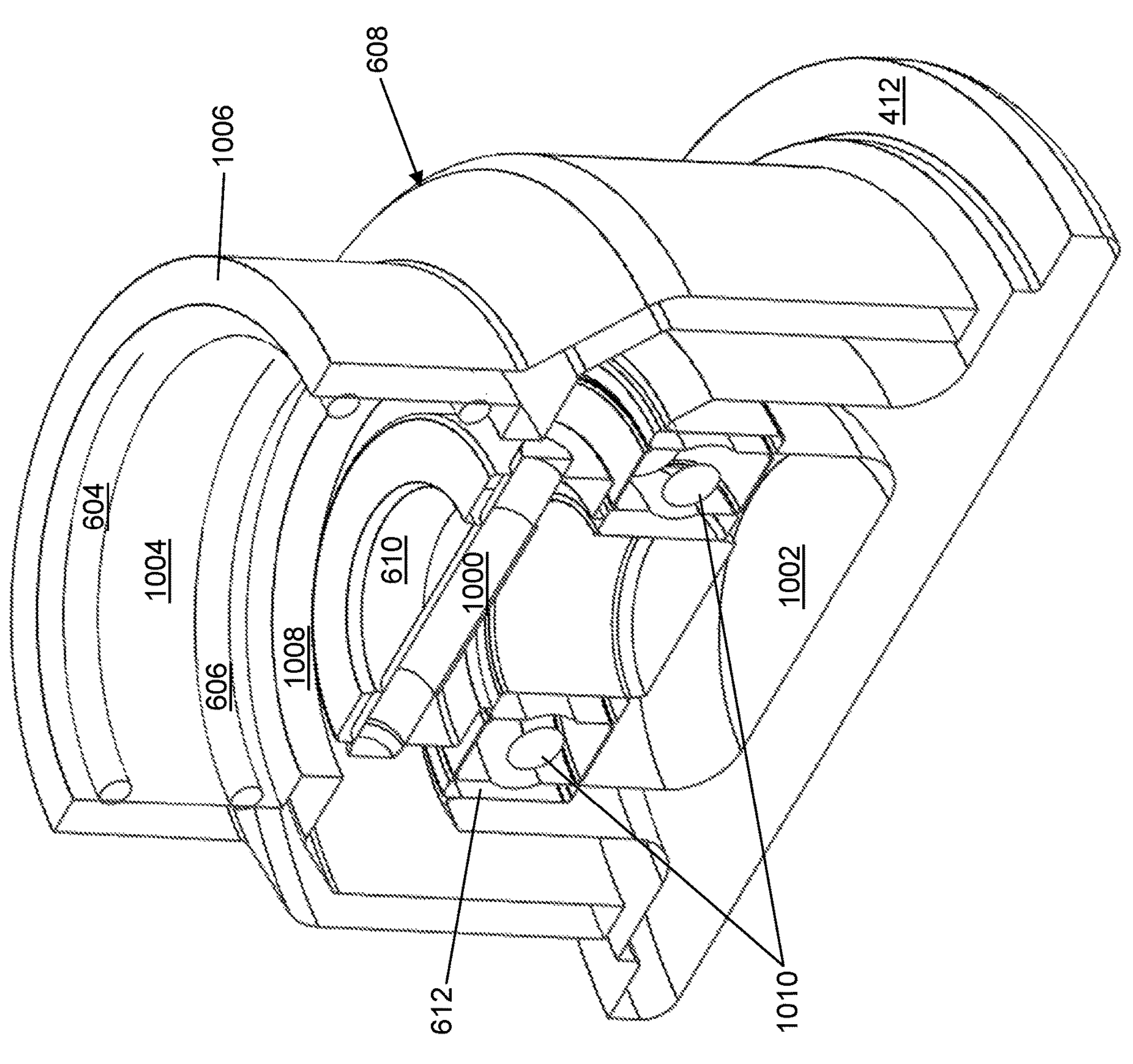
FIG. 10B depicts a vertical cross-sectional view of FIG. 10A with the auger and the evaporator body removed in accordance with an illustrative embodiment.

Referring to FIG. 10A, a zoomed perspective cross-sectional view of a bottom portion of ice forming assembly 436 is shown in accordance with an illustrative embodiment. Referring to FIG. 10B, a zoomed perspective cross-sectional view is shown with auger 500 and evaporator body 410 removed in accordance with an illustrative embodiment.

Figure 11A:
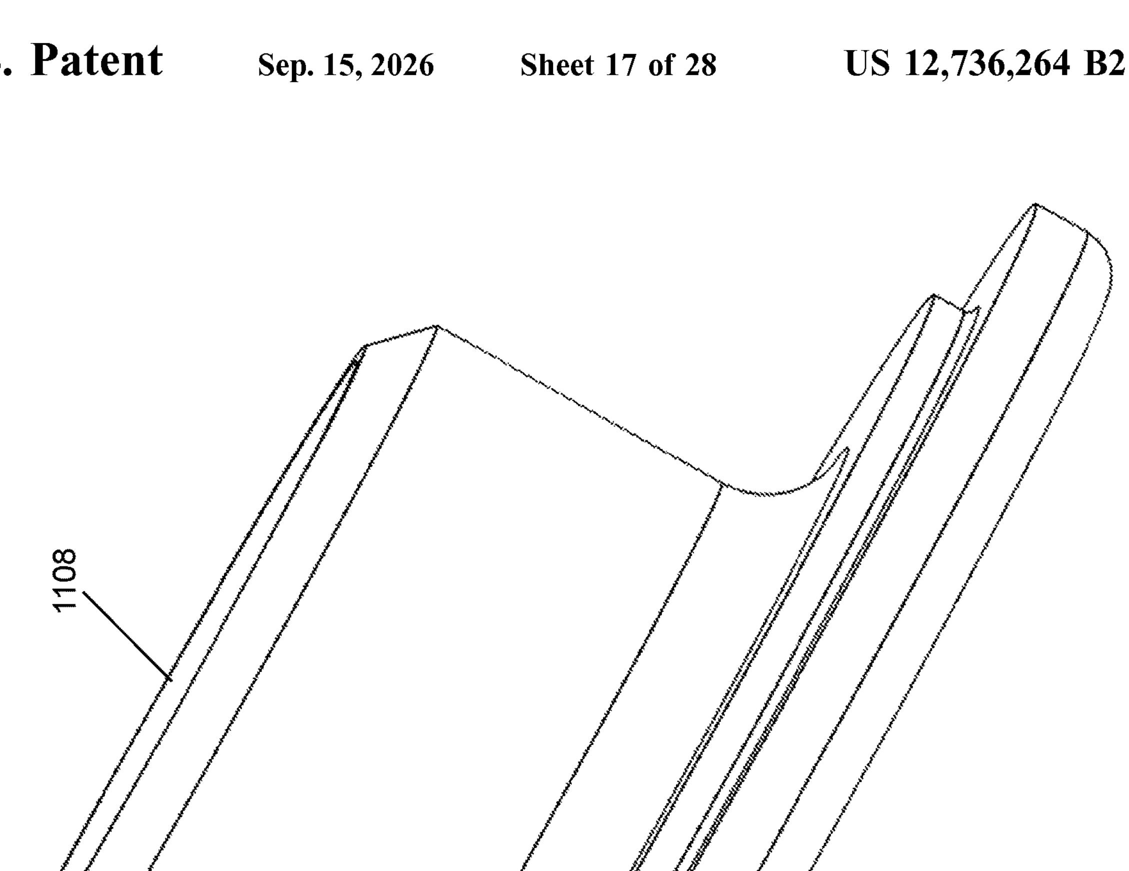
FIG. 11A depicts a perspective view of an end cap of the ice forming assembly of FIG. 6A in accordance with an illustrative embodiment.
Figure 11A:
Figure 11B:
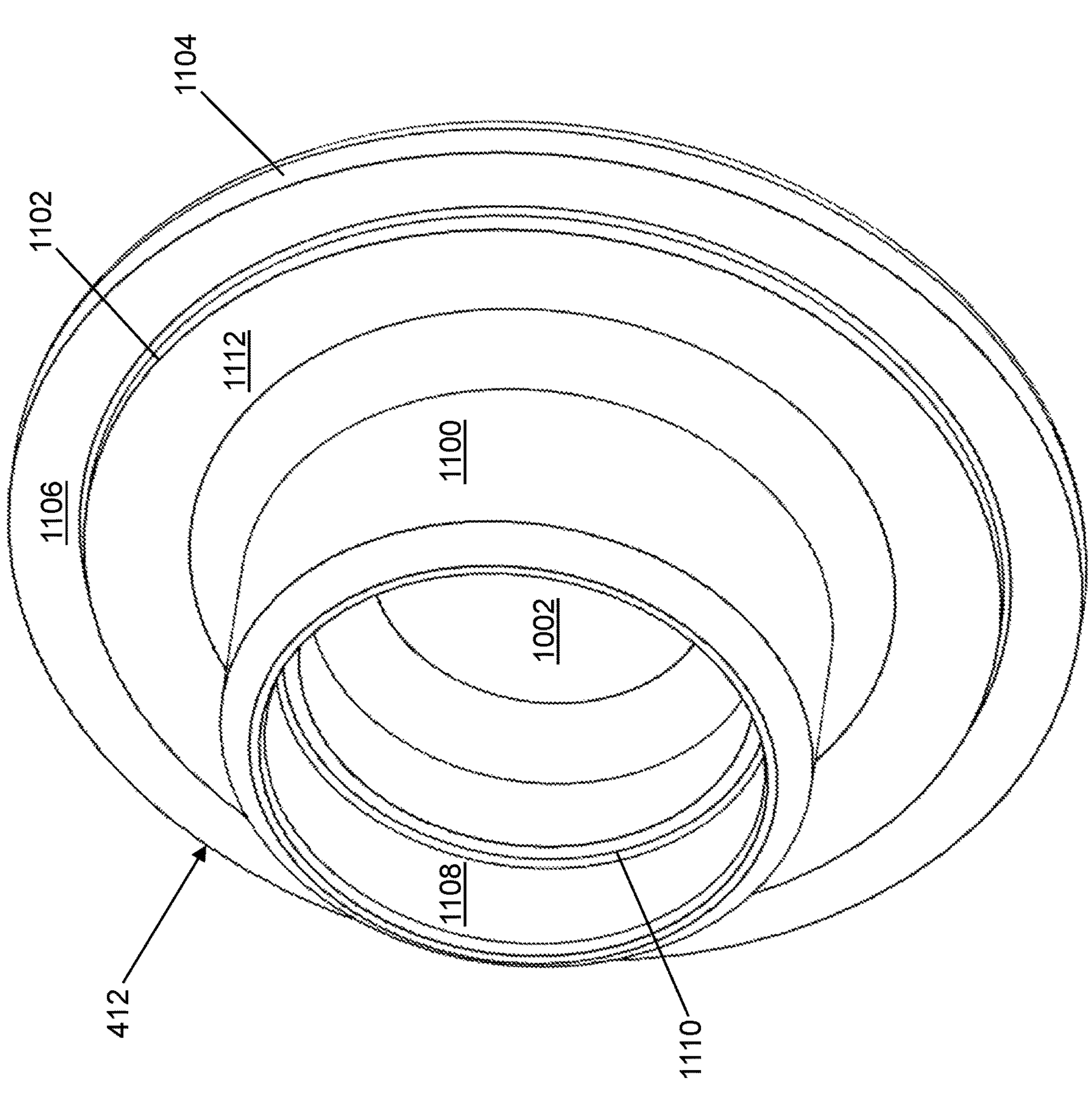
FIG. 11B depicts a top perspective view of the end cap of FIG. 11A in accordance with an illustrative embodiment.

Referring to FIG. 11A, a perspective view of end cap 412 is shown in accordance with an illustrative embodiment. Referring to FIG. 11B, a top perspective view of end cap 412 is shown in accordance with an illustrative embodiment. End cap 412 may include a cap sidewall 1100, a cap shelf wall 1102, and a cap bottom wall 1104. Cap bottom wall 1104 covers an end of bottom cylinder wall 706 of evaporator body 410. An evaporator body mounting surface 1106 is a top surface of cap bottom wall 1104.

Cap shelf wall 1102 is mounted to evaporator body mounting surface 1106 and extends upward away from evaporator body mounting surface 1106. Cap shelf wall 1102 has a smaller circumference than evaporator body mounting surface 1106 forming a shelf on cap bottom wall 1104. Bottom cylinder wall 706 of evaporator body 410 abuts a circumference of cap shelf wall 1102 and an exposed portion of evaporator body mounting surface 1106.

Evaporator body 410 may be mounted to end cap 412 using various mounting mechanisms including adhesive, welding, fasteners, etc. that provide a seal to avoid leakage of fluid introduced into bottom cylinder wall 706 through fluid intake tube 414. In an illustrative embodiment, end cap 412 is welded to bottom cylinder wall 706 of evaporator body 410.

Cap sidewall 1100 is mounted to a top surface 1112 of cap shelf wall 1102 and extends outward away from top surface 1112 of cap shelf wall 1102. Cap sidewall 1100 extends outward generally perpendicular from top surface 1112. Cap sidewall 1100 forms an aperture defined by a bottom bearing abutment wall 1108 that is sized and shaped to accept bottom bearing 612. A bottom bearing support wall 1110 extends inward from cap sidewall 1100 to form a shelf on which bottom bearing 612 is supported.

An internal cap bottom surface 1002 is defined by a portion of top surface 1112 of cap shelf wall 1102 within cap sidewall 1100. A first air pocket 1003 may be formed below bottom bearing 612, above internal cap bottom surface 1002, and within cap sidewall 1100 when fluid is provided through fluid intake tube 414.

Though described as including multiple elements to describe the characteristics of end cap 412, end cap 412 may be formed of one or more elements that are mounted to each other. As an example, end cap 412 may be formed as a single element using a molding or thermoforming process.

Figure 12A:
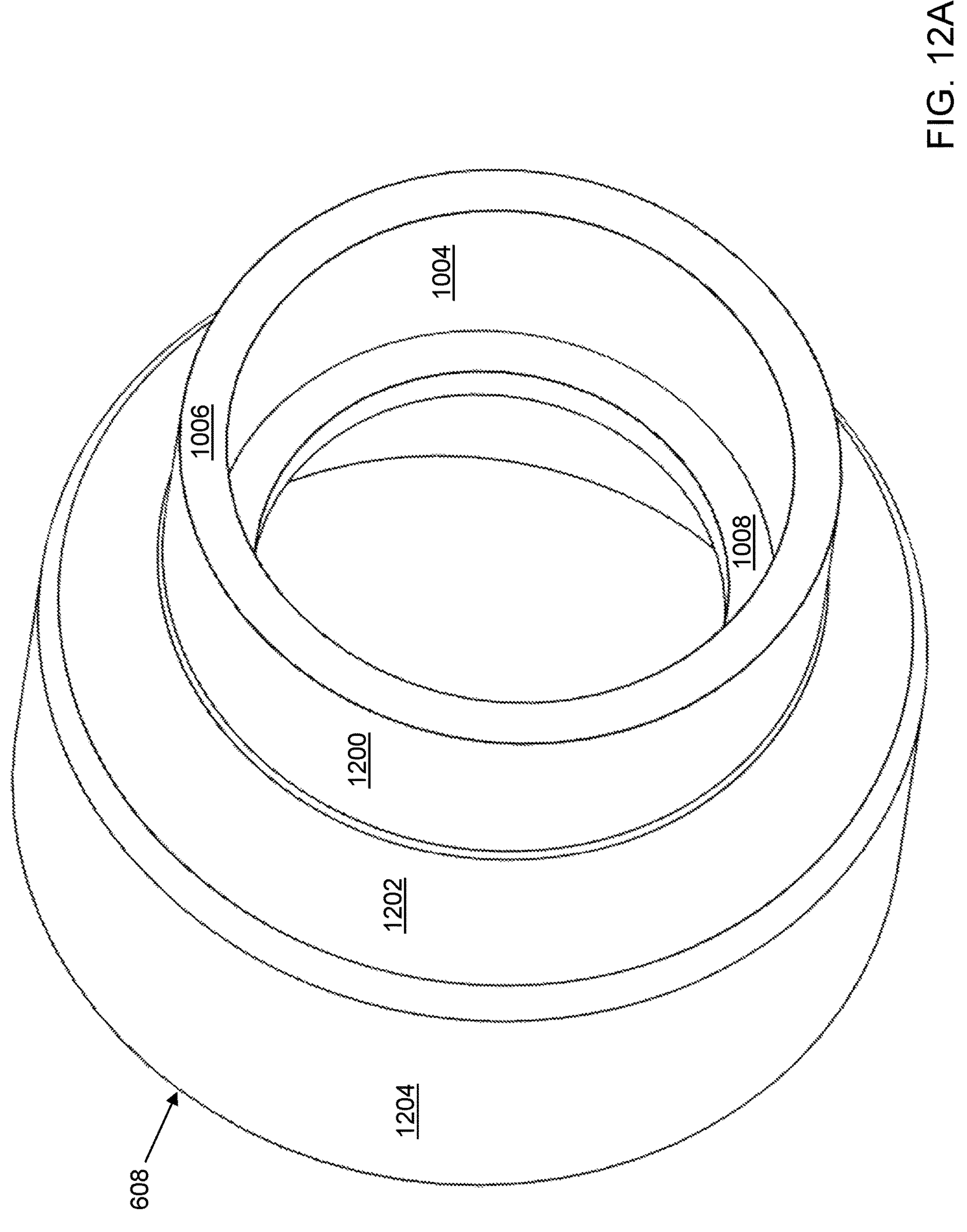
FIG. 12A depicts a perspective view of a bearing cup of the ice forming assembly of FIG. 6A in accordance with an illustrative embodiment.
Figure 12B:
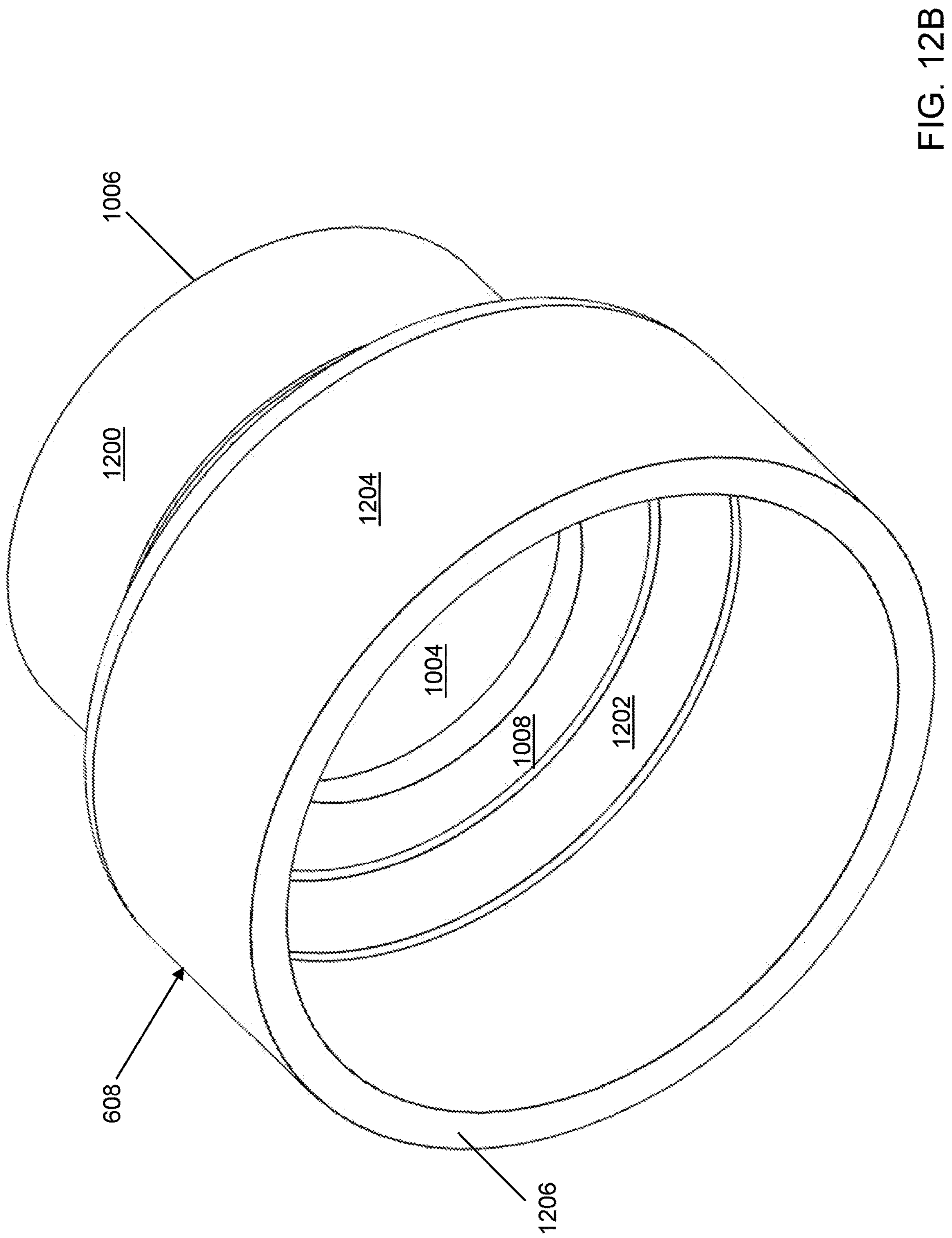
FIG. 12B depicts a bottom perspective view of the bearing cup of FIG. 12A in accordance with an illustrative embodiment.
Figure 12C:
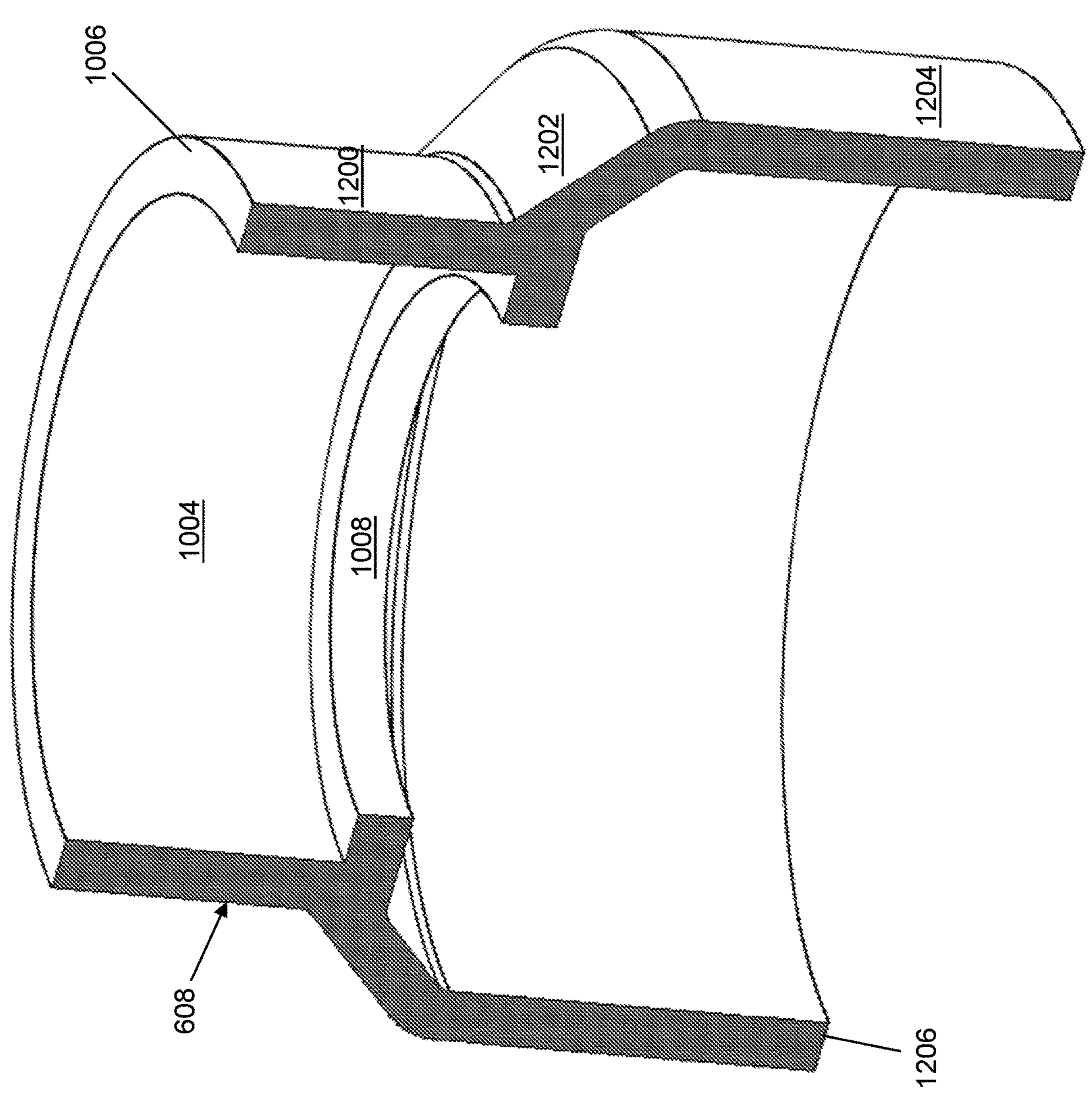
FIG. 12C depicts a vertical cross-sectional perspective view of the bearing cup of FIG. 12A in accordance with an illustrative embodiment.

Referring to FIG. 12A, a perspective view of bearing cup 608 is shown in accordance with an illustrative embodiment. Referring to FIG. 12B, a bottom perspective view of bearing cup 608 is shown in accordance with an illustrative embodiment. Referring to FIG. 12C, a vertical cross-sectional view of bearing cup 608 is shown in accordance with an illustrative embodiment. Bearing cup 608 may include a cup top wall 1200, a cup transition wall 1202, and a cup bottom wall 1204. Cup transition wall 1202 is mounted between cup top wall 1200 and cup bottom wall 1204 to transition from a fourth aperture circumference of cup top wall 1200 to a fifth aperture circumference of cup bottom wall 1204.

The fourth aperture circumference is selected to accept base body 808 of auger 500 that includes first o-ring 604 and second o-ring 606 such that an inner sealing surface 1004 of cup top wall 1200 abuts base body 808, first o-ring 604, and second o-ring 606 to provide a seal that blocks fluid from penetrating above a first auger mounting shelf surface 1006. First auger mounting shelf surface 1006 abuts bottom surface 824 of auger body 800 of auger 500. First auger mounting shelf surface 1006 may be mounted to bottom surface 824, for example, by welding, by adhesive, by a fastener, etc.

A second auger mounting shelf wall 1008 extends inward from cup transition wall 1202 to form a shelf on which mounting surface 814 of base body 808 of auger 500 is supported. Second auger mounting shelf surface 1008 may be mounted to mounting surface 814, for example, by welding, by adhesive, by a fastener, etc. In an alternative embodiment, second auger mounting shelf wall 1008 may be mounted to extend inward from cup top wall 1200 or cup bottom wall 1204.

The fifth aperture circumference is selected to accept cap sidewall 1100 of end cap 412 while forming a second air pocket 1005 below second auger mounting shelf wall 1008 and mounting surface 814, above cap shelf wall 1102, and between cup bottom wall 1204 and cap sidewall 1100. A bottom surface 1206 of cup bottom wall 1204 may not contact cap shelf wall 1102 to avoid rubbing or scraping end cap 412 when auger 500 is rotated. End cap 412 is fixed while bearing cup 608 rotates with auger 500. Nevertheless, air is trapped in the second air pocket 1005 when bearing cup 608 mounted to auger 500 is mounted within evaporator body 410 and fluid is provided through fluid intake tube 414 to interior surface 700 of evaporator body 410. The second air pocket 1005 keeps fluid from reaching bottom bearing 612.

Though described as including multiple elements to describe the characteristics of bearing cup 608, bearing cup 608 may be formed of one or more elements that are mounted to each other. As an example, bearing cup 608 may be formed as a single element using a molding or thermoforming process.

Figure 13:
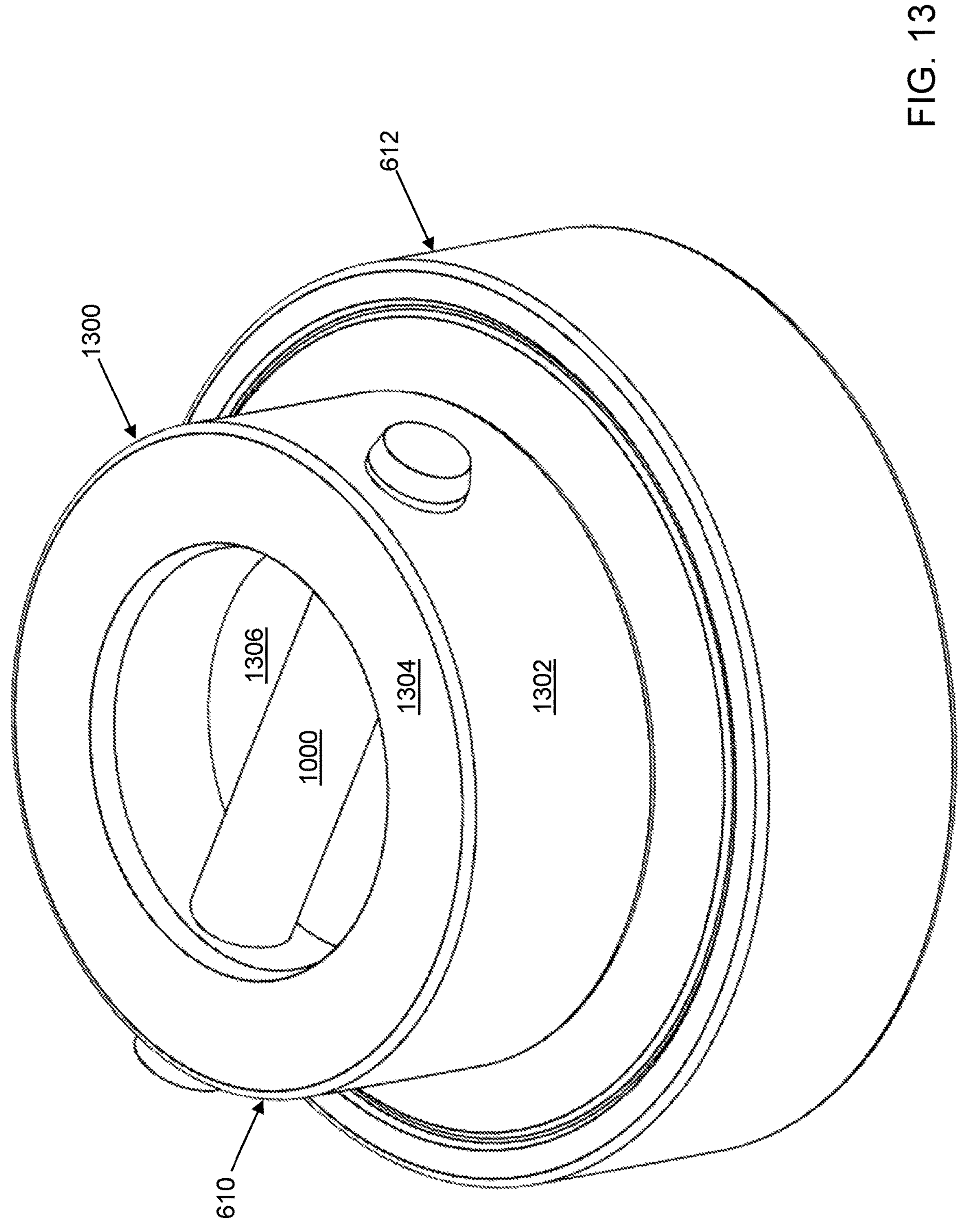
FIG. 13 depicts a perspective view of an adapter of the ice forming assembly of FIG. 6A mounted to a bearing in accordance with an illustrative embodiment.
Figure 14A:
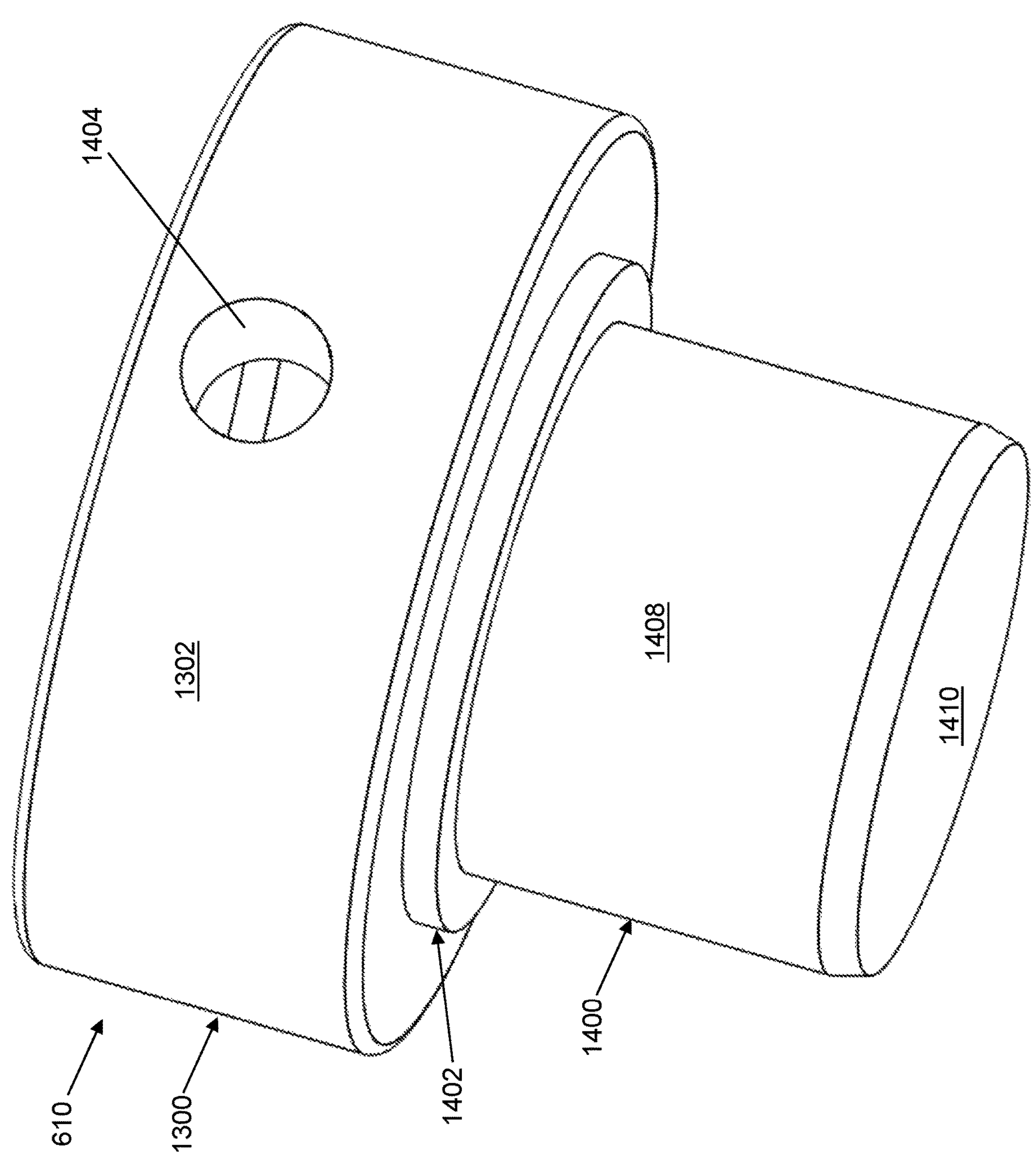
FIG. 14A depicts a top perspective view of the adapter of FIG. 13 in accordance with an illustrative embodiment.
Figure 14B:
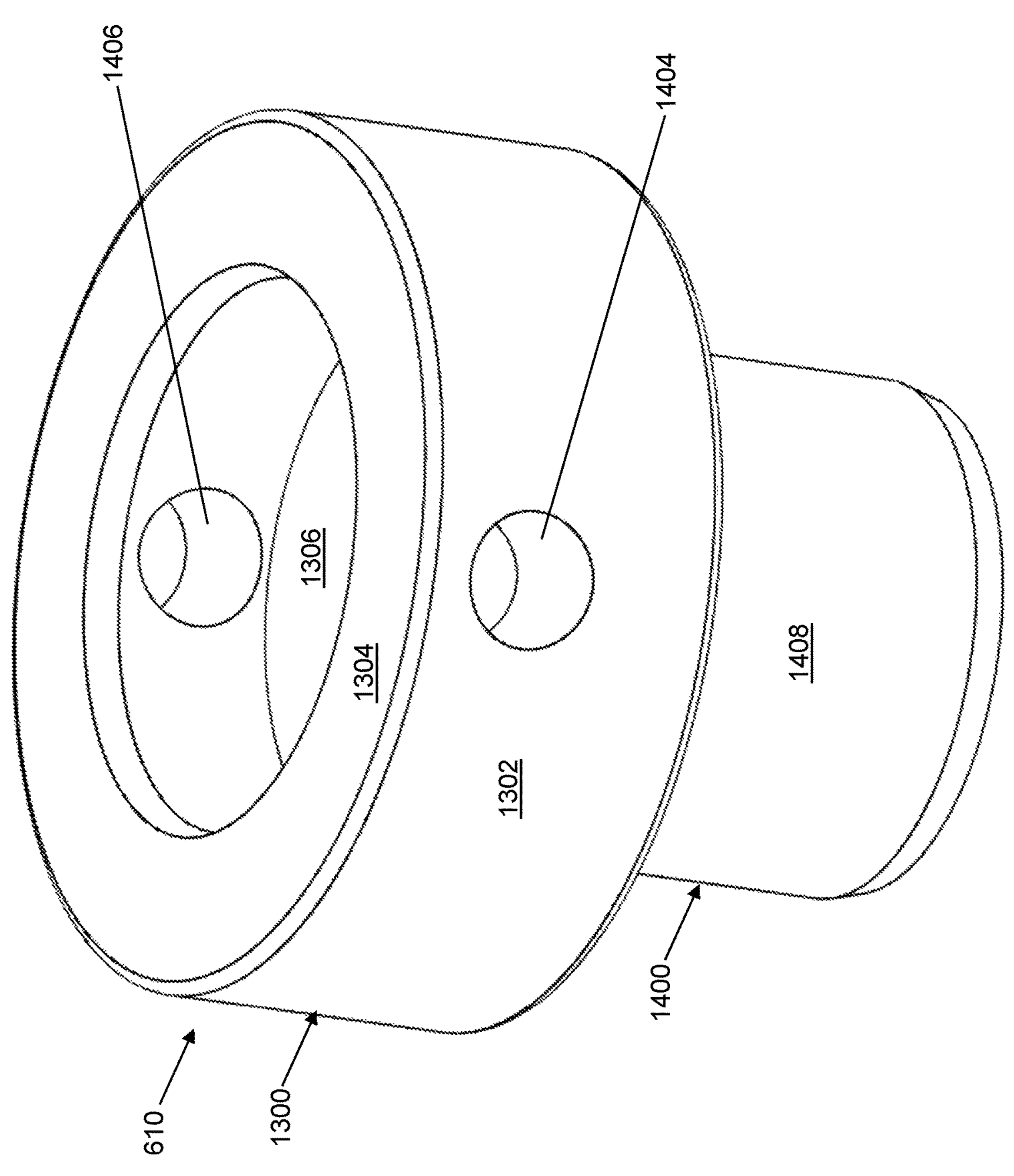
FIG. 14B depicts a perspective view of the adapter of FIG. 14A in accordance with an illustrative embodiment.
Figure 14C:
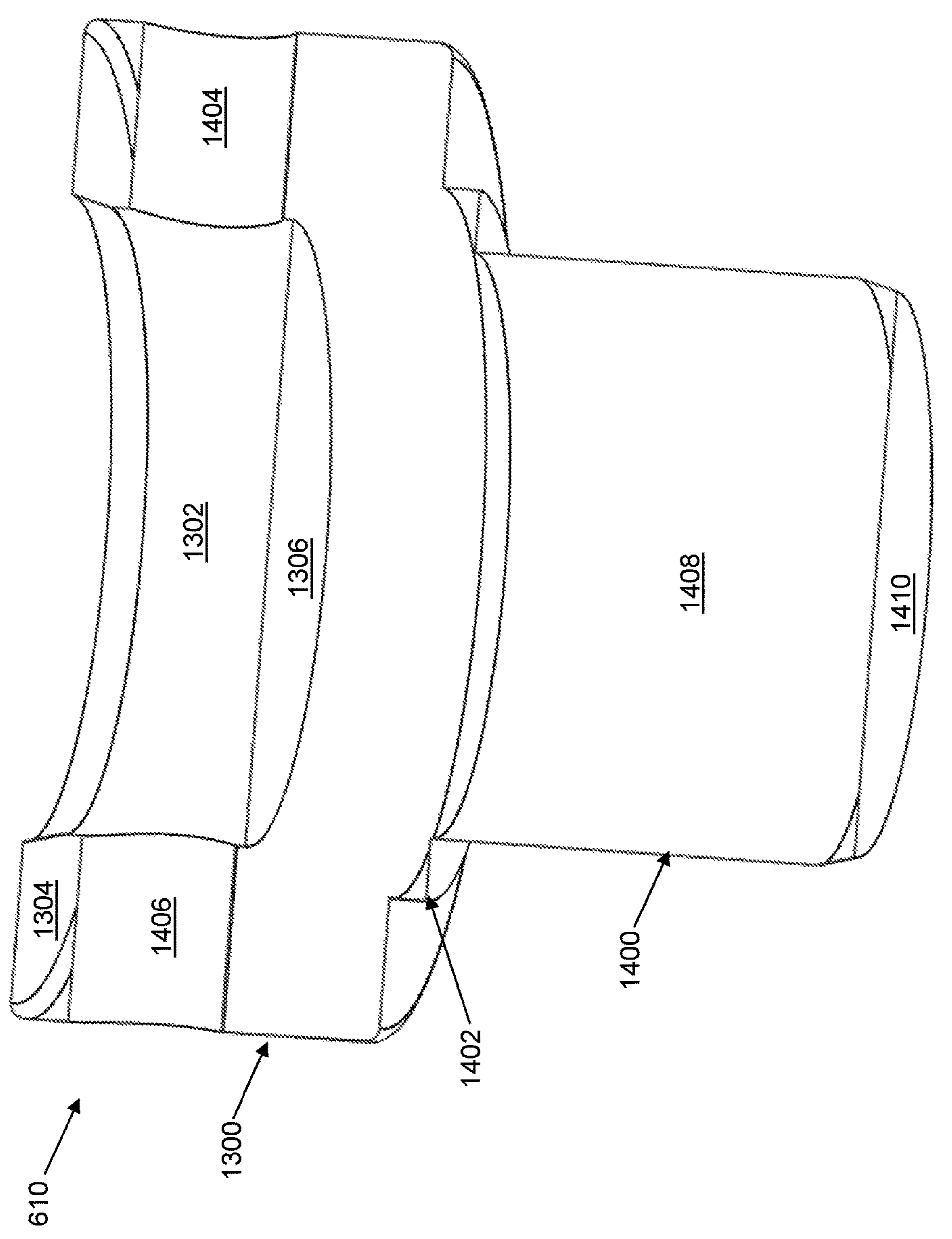
FIG. 14C depicts a vertical cross-sectional perspective view of the adapter of FIG. 14A in accordance with an illustrative embodiment.

Referring to FIG. 13, a perspective view of adapter 610 mounted to bottom bearing 612 is shown in accordance with an illustrative embodiment. Referring to FIG. 14A, a perspective view of adapter 610 is shown in accordance with an illustrative embodiment. Referring to FIG. 14B, a top perspective view of adapter 610 is shown in accordance with an illustrative embodiment. Referring to FIG. 14C, a vertical cross-sectional view of adapter 610 is shown in accordance with an illustrative embodiment. Adapter 610 may include an auger mounting platform 1300, an adapter body 1400, and an adapter shelf 1402 formed between auger mounting platform 1300 and adapter body 1400. In the illustrative embodiment, auger mounting platform 1300 has a greater horizontal cross-section width than adapter shelf 1402 that has a greater horizontal cross-section width than adapter body 1400.

Mounting platform 1300 may include adapter sidewalls 1302, an adapter top surface 1304, and an adapter bottom wall 1306. Adapter sidewalls 1302 form an internal aperture above adapter bottom wall 1306. Adapter top surface 1304 extends horizontally above adapter sidewalls 1302 to form a circular disk with a circular aperture defined therein in the illustrative embodiment. A vertical cross-section of adapter sidewalls 1302 may form other shapes including an elliptical disk, a square disk, a rectangular disk, etc.

A first pin aperture wall 1404 and a second pin aperture wall 1406 are formed through opposed sides of adapter sidewalls 1302. First pin aperture wall 1404 and second pin aperture wall 1406 are sized and shaped to accept auger pin 1000 therethrough. Auger pin 1000 is inserted through first pin aperture wall 1404 and second pin aperture wall 1406 and extends between first pin aperture wall 1404 and second pin aperture wall 1406 above adapter bottom wall 1306.

Adapter top surface 1304 may be positioned adjacent mounting surface 814 of auger 500, but not in contact with mounting surface 814. Foot bottom surface 828 of foot 816 may be supported by adapter bottom wall 1306, and pin channel 818 may be supported by auger pin 1000 to mount auger 500 to adapter 610. Adapter 610 rotates with auger 500.

Adapter body 1400 may include an adapter body sidewall 1408 and an adapter bottom surface 1410. In the illustrative embodiment, a vertical cross-section of adapter body sidewall 1408 and of adapter shelf 1402 is circular. A vertical cross-section of adapter sidewalls 1302 may form other shapes including an ellipse, a square, a rectangle, an elliptical disk, a square disk, a rectangular disk, etc.

Though described as including multiple elements to describe the characteristics of adapter 610, adapter 610 may be formed of one or more elements that are mounted to each other. As an example, adapter 610 may be formed as a single element using a molding or thermoforming process.

Figure 15:
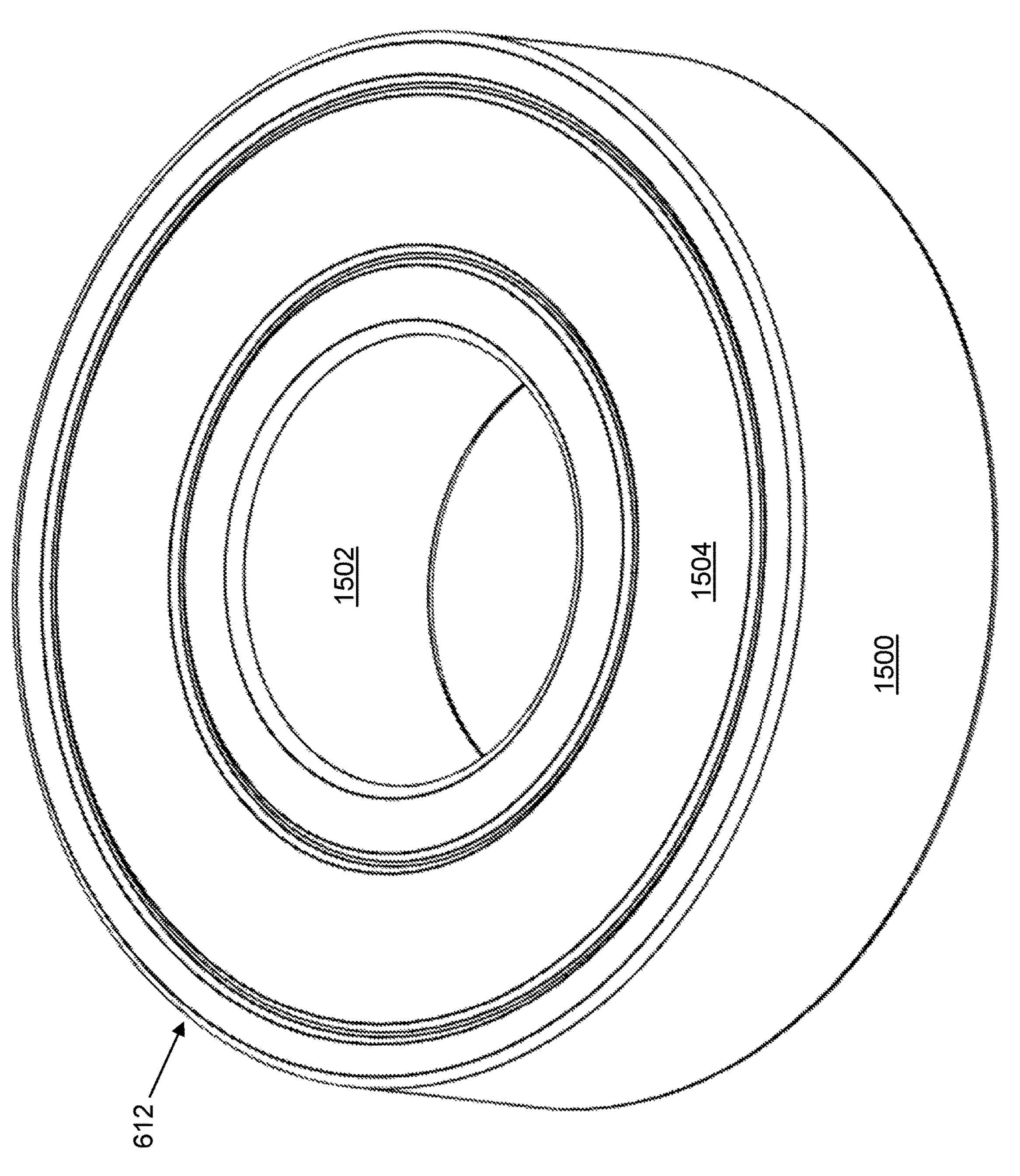
FIG. 15 depicts a top perspective view of the bearing of FIG. 13 in accordance with an illustrative embodiment.

Referring to FIG. 15, a perspective view of bottom bearing 612 is shown in accordance with an illustrative embodiment. Bottom bearing 612 may include an outer race 1500, an inner race 1502, a seal 1504, and a plurality of ball bearings 1010 (shown referring to FIG. 10) mounted within seal 1504. Seal 1504 is mounted between outer race 1500 and inner race 1502. Inner race 1502 rotates with seal 1502 and the plurality of ball bearings 1010 when auger 500 is rotated while outer race 1500 is stationary.

Bottom bearing 612 is mounted between bottom bearing abutment wall 1108 and adapter body sidewall 1408. Bottom bearing 612 is supported by bottom bearing support wall 1110. In an illustrative embodiment, bottom bearing 612 is press fit to end cap 412.

In an illustrative embodiment, bottom bearing 612 and top bearing 502 are stainless steel ball bearings. In an illustrative embodiment, bottom bearing 612 and top bearing 502 may be permanently lubricated as understood by a person of skill in the art.

Figure 16:
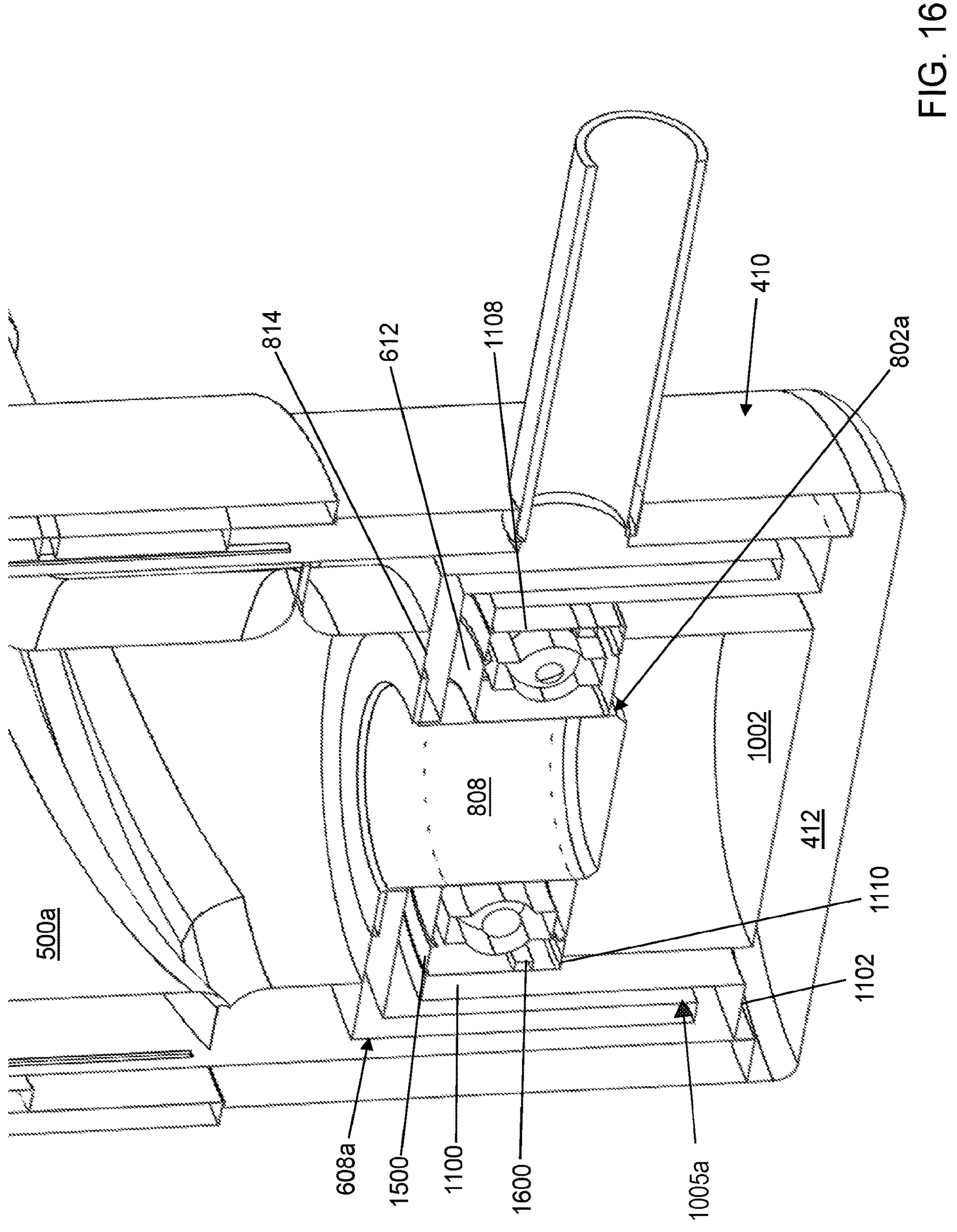
FIG. 16 depicts a zoomed vertical cross-sectional view of a second bottom portion of the ice forming assembly of the nugget ice maker of FIG. 4A in accordance with another illustrative embodiment.

Referring to FIG. 16, a zoomed perspective cross-sectional view is shown of a second bottom portion of the ice forming assembly of ice maker 200 in accordance with an illustrative embodiment. The second bottom portion may include a second auger 500*a*, a third o-ring 1600, a second bearing cup 608*a*, and evaporator body 410. The second bottom portion does not include adapter 610. Second auger 500*a* is similar to auger 500 except second auger 500*a* does not include foot 816 and may include a second auger base 802*a*. Second auger base 802*a* is similar to auger base 802 except second auger base 802*a* does not include first channel 810 or second channel 812 formed in exterior surface 826 of base body 808 of auger 500.

Bottom bearing 612 is mounted between bottom bearing abutment wall 1108 of end cap 412 and base body 808 of second auger base 802*a*. Third o-ring 1600 is mounted between bottom bearing abutment wall 1108 and outer wall 1500 of bottom bearing 612.

Figure 17:
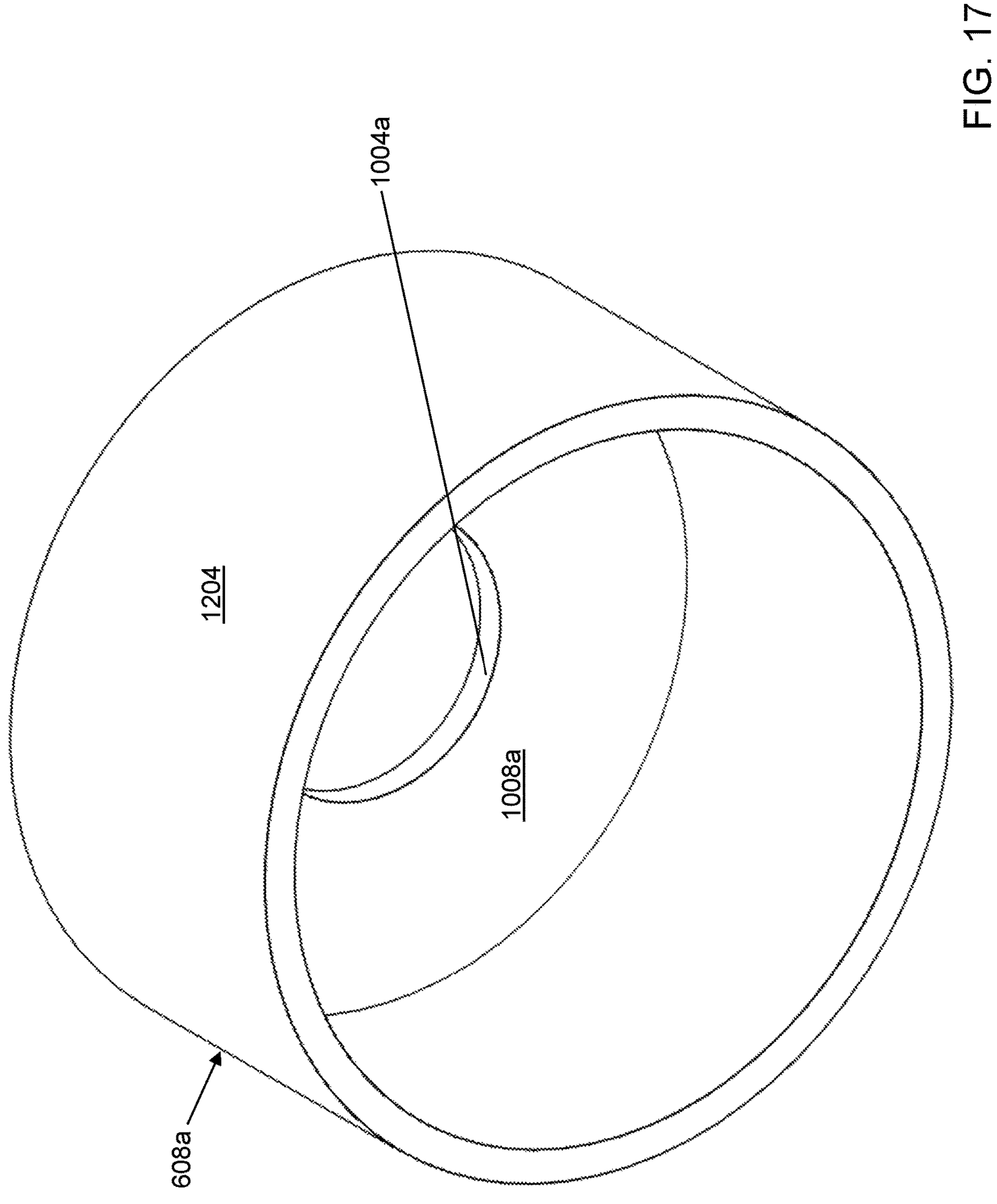
FIG. 17 depicts a bottom perspective view of a bearing cup of the ice forming assembly of FIG. 16 in accordance with an illustrative embodiment.

Referring to FIG. 17, a bottom perspective view of second bearing cup 608*a* in accordance with an illustrative embodiment. Second bearing cup 608*a* may include a second inner sealing surface 1004*a*, a third auger mounting shelf wall 1008*a*, and cup bottom wall 1204. Third auger mounting shelf wall 1008*a* is mounted across cup bottom wall 1204. Second inner sealing surface 1004*a* defines an aperture formed through third auger mounting shelf wall 1008*a*. Second bearing cup 608*a* may not include cup top wall 1200 and/or cup transition wall 1202.

Second inner sealing surface 1004*a* may abut base body 808 of second auger base 802*a* of second auger 500*a*. Mounting surface 814 of second auger base 802*a* of second auger 500*a* may be supported by third auger mounting shelf wall 1008*a*. Second bearing cup 608*a* may be mounted to second auger 500*a*, for example, by welding, by adhesive, by a fastener, etc. so that second bearing cup 608*a* rotates with second auger 500*a*.

Though described as including multiple elements to describe the characteristics of second bearing cup 608*a*, second bearing cup 608*a* may be formed of one or more elements that are mounted to each other. As an example, second bearing cup 608*a* may be formed as a single element using a molding or thermoforming process.

Air is trapped in a third air pocket 1005 a when second bearing cup 608 a mounted to second auger 500 a is mounted within evaporator body 410 and fluid is provided through fluid intake tube 414 to interior surface 700 of evaporator body 410. The third air pocket 1005 a is defined between cup bottom wall 1204 and cap sidewall 1100, above cap shelf wall 1102, and below third auger mounting shelf wall 1008 a. The third air pocket 1005 a keeps fluid from reaching bottom bearing 612.

Bearing cup 608 and second bearing cup 608 a are inverted cups sealed to auger base 802 and second auger base 802 a, respectively. Bottom bearing 612 is mounted within evaporator body 410. End cap 412 seals bottom cylinder wall 706 of evaporator body 410. Bearing cup 608 and second bearing cup 608 a provide a simple mechanism for creating a microenvironment from the second air pocket 1005 or the third air pocket 1005 a, respectively, to isolate bottom bearing 612 from the fluid introduced into evaporator body 410. Wear material and any lubricant leaking from bottom bearing 612 is further trapped in the first air pocket 1003 within cap sidewall 1100 of end cap 412 and isolated from the fluid introduced into evaporator body 410.

The components of ice maker 200 may be formed of one or more materials, such as metal, glass, and/or plastic having a sufficient strength, rigidity, and/or flexibility to support ice making, sealing, etc.

As used in this disclosure, the term "mount" is intended to define a structural connection between two or more structural components and includes join, unite, connect, couple, associate, insert, hang, hold, affix, attach, fasten, bind, paste, secure, bolt, screw, rivet, solder, weld, glue, adhere, form over, layer, and other similar terms. The phrases "mounted on" and "mounted to" include any interior or exterior portion of the components referenced. These phrases also encompass direct mounting (in which the referenced components are in direct contact) and indirect mounting (in which the referenced components are not in direct contact). Components referenced as mounted to each other may further be integrally formed together, for example, using a molding process as understood by a person of skill in the art. Though described as including multiple structural components mounted to each other, components described herein may be formed of a single continuous piece of material, for example, by molding, or may be formed of multiple distinct pieces mounted together, for example, attached to each other using various fasteners including adhesives, screws, rivets, welded joints, etc. The components of ice maker assembly 100 may be formed of one or more materials, such as metal, glass, and/or plastic having a sufficient strength and rigidity and aesthetic value to provide the illustrated and/or described function.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. An ice maker comprising:

an evaporator body;

an end cap mounted to an end of the evaporator body, the end cap comprising a cap bottom wall, a cap shelf wall, and a cap sidewall mounted to extend away from the cap shelf wall, wherein the cap sidewall is positioned within the evaporator body, wherein the end cap further comprises a shelf that extends inward from an interior surface of the cap sidewall;

an auger comprising an auger body mounted within the evaporator body the auger body comprising a first end and a second end that is opposite the first end;

a connector rod comprising a first rod end and a second rod end that is opposite the first rod end, the first rod end of the connector rod is mounted to the first end of the auger body and the second rod end of the connector rod is configured to mount to a motor, wherein the auger is mounted to rotate under control of the motor; and a base mounted to extend away from the second end of the auger body;

a bearing mounted to the base of the auger within the cap sidewall of the end cap, wherein the bearing is supported by the shelf, wherein at least portions of the cap bottom wall, the interior surface of the cap sidewall, and a bottom surface of the bearing define a first air pocket to trap wear material and lubricant of the bearing; and a bearing cup comprising an auger mounting shelf wall mounted to the base of the auger and a cup sidewall mounted to extend away from the auger mounting shelf wall, wherein the cup sidewall surrounds the bearing and the cap sidewall of the end cap, wherein the bearing cup is mounted to rotate with the auger when the auger is rotated, wherein at least portions of the auger mounting shelf wall, the cap shelf wall, the cup sidewall, and the cap sidewall define a second air pocket to prevent fluid from reaching the bearing.

2. The ice maker of claim 1, further comprising an adapter mounted between the bearing and the base of the auger within the cap sidewall of the end cap to mount the bearing to the base of the auger.

3. The ice maker of claim 2, wherein the auger is mounted to rotate under control of the motor.

4. The ice maker of claim 3, wherein the adapter is mounted to rotate with the auger when the auger is rotated.

5. The ice maker of claim 2, wherein the adapter comprises:

an auger mounting platform, wherein the base of the auger is mounted to the auger mounting platform; and an adapter body mounted to the auger mounting platform, wherein the bearing encircles and abuts the adapter body.

6. The ice maker of claim 5, wherein a pin aperture wall is formed through the auger mounting platform.

7. The ice maker of claim 6, further comprising an auger pin mounted within the pin aperture wall.

8. The ice maker of claim 7, wherein a pin channel is formed in the base of the auger, wherein the pin channel is mounted to the auger pin.

9. The ice maker of claim 8, wherein a bottom surface of the base of the auger is supported by a bottom wall of the auger mounting platform.

10. The ice maker of claim 5, wherein the adapter is mounted to rotate with the auger when the auger is rotated, wherein an inner race of the bearing is mounted to rotate with the adapter.

11. The ice maker of claim 1, wherein an inner race of the bearing is mounted to rotate with the auger when the auger is rotated.

12. The ice maker of claim 1, wherein the end cap further comprises a shelf that extends upward from the cap bottom wall, wherein the end of the evaporator body is sealed against the cap bottom wall and the shelf.

13. The ice maker of claim 1, wherein the cup sidewall of the bearing cup does not contact the end cap or the bearing.

14. The ice maker of claim 1, wherein the auger mounting shelf wall is mounted to the second end of the auger body.

15. The ice maker of claim 1, wherein an aperture is formed through the auger mounting shelf wall, wherein an interior surface of the auger mounting shelf wall that forms the aperture encircles and abuts the base of the auger.

16. The ice maker of claim 1, wherein the bearing cup further comprises a second cup sidewall mounted to the cup sidewall, wherein an interior surface of the second cup sidewall encircles and abuts the base of the auger.

* * * * *